(12) United States Patent
Nasr et al.

(10) Patent No.: US 7,790,784 B2
(45) Date of Patent: Sep. 7, 2010

(54) COMPOSITION OF MATTER

(75) Inventors: Moe Nasr, Houston, TX (US); Kurt Kuriger, Willis, TX (US); Paul J. Mollinger, Blacklick, OH (US); Larry R. Fairbanks, Columbus, OH (US); John P. Frechette, Powell, OH (US); Ashok M. Adur, Westlake, OH (US)

(73) Assignee: The Crane Group Companies Limited, Columbus, OH (US)

( * ) Notice: Subject to any disclaimer, the term of this patent is extended or adjusted under 35 U.S.C. 154(b) by 188 days.

(21) Appl. No.: 12/057,173

(22) Filed: Mar. 27, 2008

(65) Prior Publication Data

US 2009/0062431 A1 Mar. 5, 2009

Related U.S. Application Data

(63) Continuation-in-part of application No. 11/278,537, filed on Apr. 3, 2006, which is a continuation-in-part of application No. 10/971,861, filed on Oct. 22, 2004.

(60) Provisional application No. 60/667,633, filed on Apr. 1, 2005, provisional application No. 60/514,414, filed on Oct. 24, 2003.

(51) Int. Cl.
*C09D 5/29* (2006.01)
(52) U.S. Cl. ..................................... 523/171
(58) Field of Classification Search .................. 523/171
See application file for complete search history.

(56) References Cited

U.S. PATENT DOCUMENTS

| | | | |
|---|---|---|---|
| 2,094,688 A | 10/1937 | Wallace et al. |
| 2,095,641 A | 10/1937 | Knight |
| 2,130,911 A | 9/1938 | Teunon |
| 3,924,037 A | 12/1975 | Sullivan |
| 3,940,528 A | 2/1976 | Roberts |
| 3,950,477 A | 4/1976 | Di Giacomo |
| 4,043,826 A | 8/1977 | Hum |
| 4,128,369 A | 12/1978 | Kemerer et al. |
| 4,181,286 A | 1/1980 | Van Doren |
| 4,235,948 A | 11/1980 | Holmes |
| 4,271,111 A | 6/1981 | Sheber |
| 4,275,540 A | 6/1981 | Keller |
| 4,288,959 A | 9/1981 | Murdock |
| 4,402,169 A | 9/1983 | Martin et al. |
| 4,441,944 A | 4/1984 | Massey |
| 4,495,738 A | 1/1985 | Sheber |
| 4,522,002 A | 6/1985 | Davis et al. |
| 4,644,719 A | 2/1987 | Salazar |
| 4,668,451 A | 5/1987 | Langson |
| 4,680,911 A | 7/1987 | Davis et al. |
| 4,734,302 A | 3/1988 | Baskin |
| 4,847,026 A | 7/1989 | Jarboe et al. |
| 4,877,656 A | 10/1989 | Baskin |
| 4,956,030 A | 9/1990 | Baskin |
| 5,029,425 A | 7/1991 | Bogataj |
| 5,043,377 A | 8/1991 | Nogi et al. |
| 5,055,327 A | 10/1991 | Baskin |
| 5,224,318 A | 7/1993 | Kemerer |
| 5,244,941 A | 9/1993 | Bruckbauer et al. |
| 5,245,809 A | 9/1993 | Harrington |
| 5,395,577 A | 3/1995 | Gorski |
| 5,634,307 A | 6/1997 | Larriberot et al. |
| 5,685,523 A | 11/1997 | Sugiyama |
| 5,713,561 A | 2/1998 | Sugiyama |
| 5,787,667 A | 8/1998 | Sheahan et al. |
| 5,817,202 A | 10/1998 | Seidner |
| 5,836,572 A | 11/1998 | Sugiyama |
| 5,911,927 A | 6/1999 | Roberts |
| 5,934,035 A | 8/1999 | Rasmussen et al. |
| 6,013,350 A | 1/2000 | Mizuno |
| 6,025,052 A | 2/2000 | Maurer et al. |
| 6,041,561 A | 3/2000 | LeBlang |
| 6,042,766 A | 3/2000 | Bahr |
| 6,054,080 A | 4/2000 | Sheahan et al. |
| 6,060,006 A | 5/2000 | Savenok |
| 6,085,479 A | 7/2000 | Carver |
| 6,113,995 A | 9/2000 | Austin |

(Continued)

FOREIGN PATENT DOCUMENTS

CA 2382900 A1 10/2003

(Continued)

OTHER PUBLICATIONS

McKee, A. M., "Stonewalling America", Cultural Resource Management, vol. 18, No. 08, 1995, pp. 30-33.

(Continued)

*Primary Examiner*—Edward J Cain
(74) *Attorney, Agent, or Firm*—Standley Law Group LLP

(57) ABSTRACT

Composition of matter for the production of simulated stone, masonry, and brick textured products. Exemplary embodiments of panels, wall structures, and other products may have contoured and textured surfaces and may simulate the appearances of conventional building or construction materials including, but not limited to, stone, bricks, masonry, concrete, stucco, wood, or other conventional building materials, and combinations of any of these materials are disclosed. The disclosed invention is not limited to products in the building or construction industries and may be applied in the manufacture of a wide variety of products in other industries.

26 Claims, 34 Drawing Sheets

U.S. PATENT DOCUMENTS

| | | |
|---|---|---|
| 6,122,877 A | 9/2000 | Hendrickson et al. |
| 6,185,888 B1 | 2/2001 | Wasson |
| 6,248,411 B1 | 6/2001 | Warfel |
| 6,355,193 B1 | 3/2002 | Stott |
| 6,362,302 B1 | 3/2002 | Boddie |
| 6,374,552 B1 | 4/2002 | Price |
| 6,517,897 B1 | 2/2003 | Bordener |
| 6,584,742 B1 | 7/2003 | Kligler et al. |
| 6,599,452 B1 | 7/2003 | Ferguson |
| 6,607,683 B1 | 8/2003 | Harrington |
| 6,680,090 B2 | 1/2004 | Godavarti et al. |
| 6,682,789 B2 | 1/2004 | Godavarti et al. |
| 6,682,814 B2 | 1/2004 | Hendrickson et al. |
| 6,691,471 B2 | 2/2004 | Price |
| 6,719,277 B2 | 4/2004 | Ohanesian |
| 6,725,614 B2 | 4/2004 | Schiedegger et al. |
| 6,726,864 B2 | 4/2004 | Nasr et al. |
| 6,742,315 B2 | 6/2004 | Linn |
| 6,848,228 B1 | 2/2005 | Williams |
| 6,851,235 B2 | 2/2005 | Baldwin |
| 6,944,998 B1 | 9/2005 | King |
| 6,997,427 B2 | 2/2006 | Manthei |
| 7,467,500 B2 | 12/2008 | Fairbanks et al. |
| 2002/0145229 A1 | 10/2002 | Kuriger et al. |
| 2003/0050378 A1* | 3/2003 | Blanchard et al. ........... 524/423 |
| 2004/0211141 A1 | 10/2004 | Sandy |
| 2005/0087908 A1 | 4/2005 | Nasr et al. |
| 2005/0252146 A1 | 11/2005 | MacDonald et al. |
| 2006/0032184 A1 | 2/2006 | Almeter |
| 2006/0059838 A1 | 3/2006 | Pimental |
| 2006/0197257 A1 | 9/2006 | Burt et al. |
| 2007/0227087 A1 | 10/2007 | Nasr et al. |

FOREIGN PATENT DOCUMENTS

| | | |
|---|---|---|
| WO | 03/041935 A1 | 5/2003 |
| WO | 2005/014256 A1 | 2/2005 |

OTHER PUBLICATIONS

Webpages, www.aftec.com, AFTEC Advanced Forming Technology, printed Feb. 27, 2006 and Mar. 3, 2006, 9 pages.

Webpages, www.ankerpillars.com, Anker Pillar Systems, printed Jun. 2, 2006, 34 pages.

Webpages, backyardamerica.com, Backyard America, Inc., printed Feb. 23, 2006, 21 pages.

Webpages, www.condecco.us, PolyRock Technologies, LLC, printed Apr. 28, 2006, 36 pages.

Webpages, www.everlock.com, Everlock Systems, Inc., printed Feb. 23, 2005, 2 pages.

Webpages, www.genstoneproducts.com, GenStone, printed Feb. 23, 2006, 7 pages.

Webpage, www.infolink.com.au, "Textured stone panels", printed Feb. 23, 2005, 1 page.

Webpages, www.n-usa.com, Nichiha USA, Inc., printed Feb. 23, 2005, 2 pages.

Webpage, www.naliteinternational.com, Nailite International, printed Feb. 23, 2005, 1 page.

Webpages, www.nextstone.com, NextStone LLC, printed Feb. 23, 2006, 10 pages.

Webpage, www.novik.com, Novik Inc., printed Feb. 23, 2005, 1 page.

Webpages, www.owenscorning.com, Owens Corning, printed Feb. 24, 2006, 3 pages.

Webpages, www.professionalsidinginc.com, Professional Siding Inc., printed Mar. 21, 2005, 2 pages.

Webpages, www.spiplastics.com, SPI Industries Inc., printed Feb. 23, 2006, 16 pages.

Webpages, store.yahoo.com, Foam Visions Online Store, printed Feb. 23, 2005, 3 pages.

Webpages, www.tricm.com, Tri Custom Manufacturing LLC, printed Mar. 3, 2006, 16 pages.

* cited by examiner

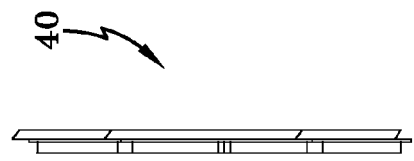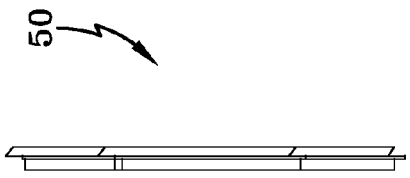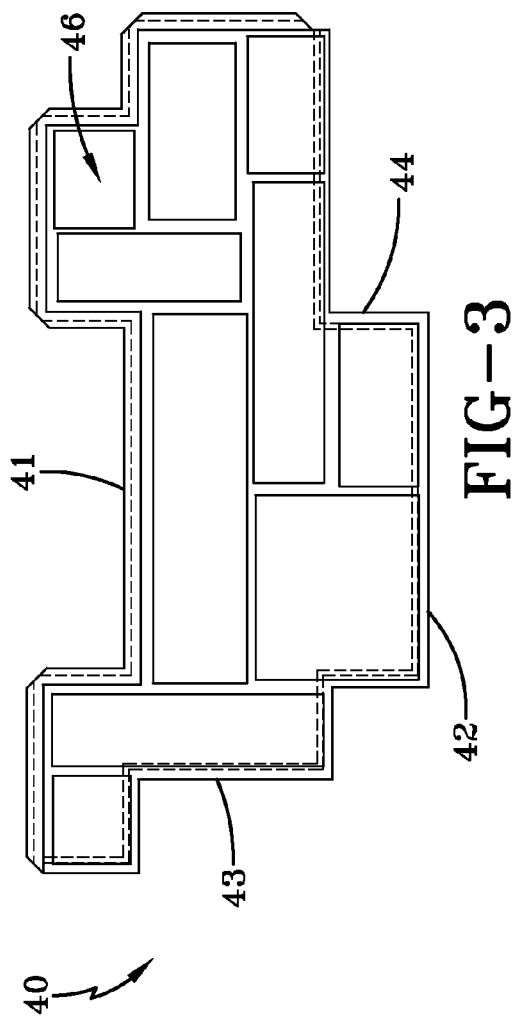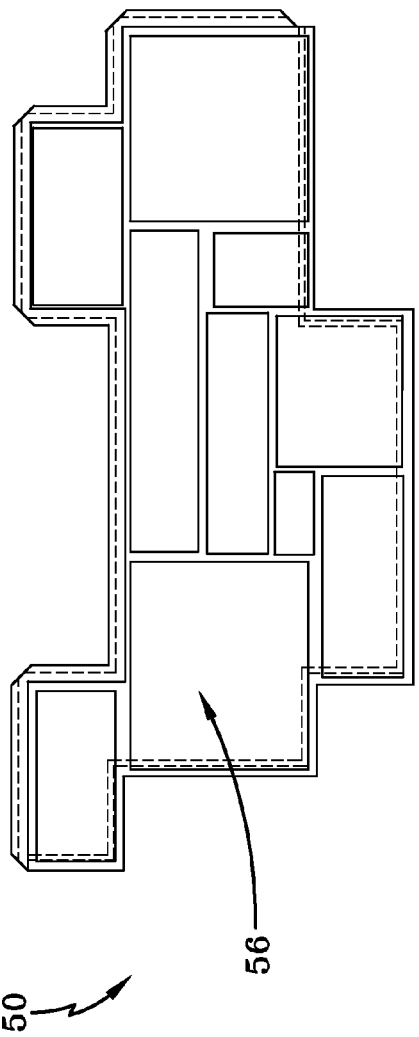

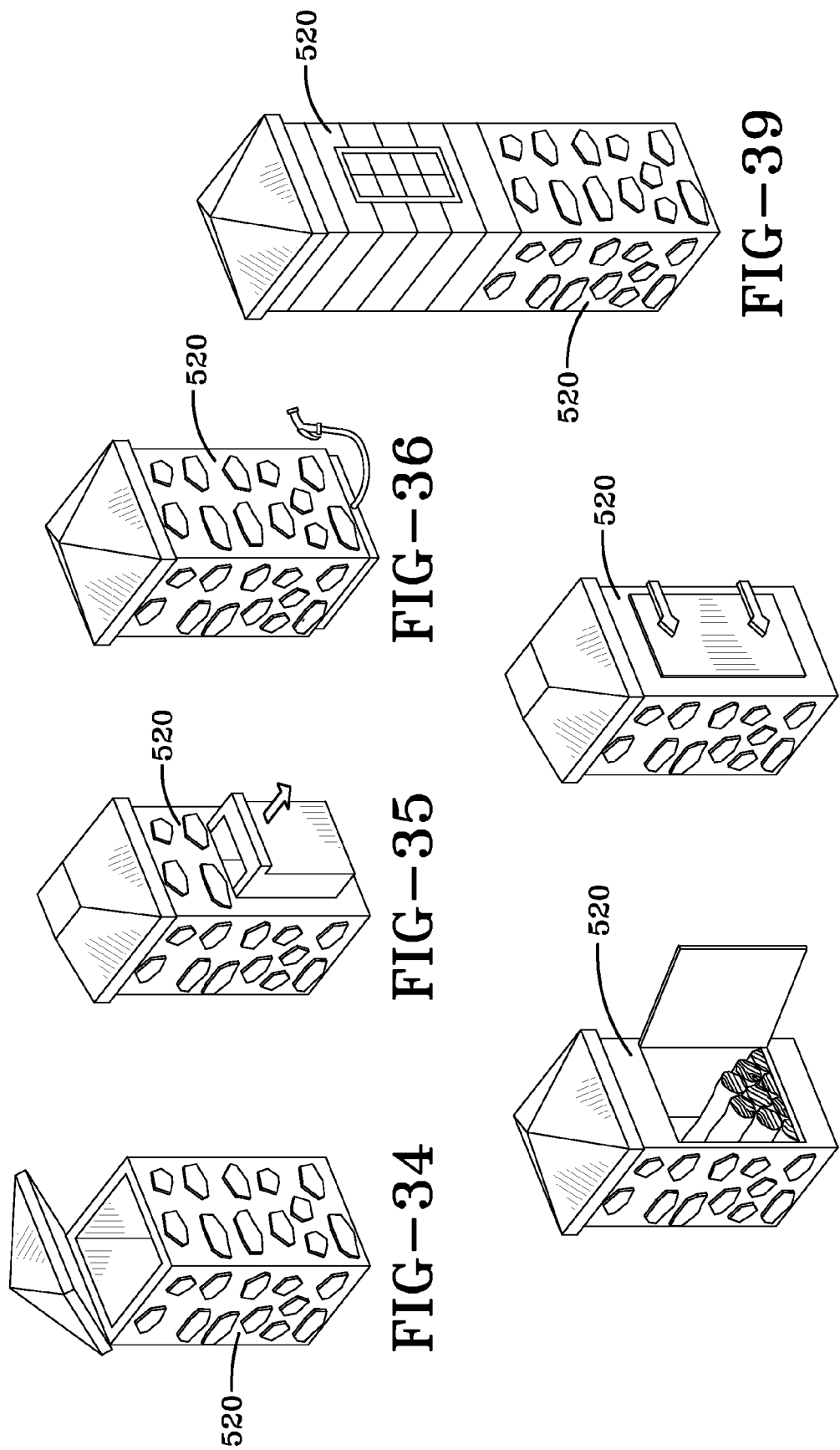

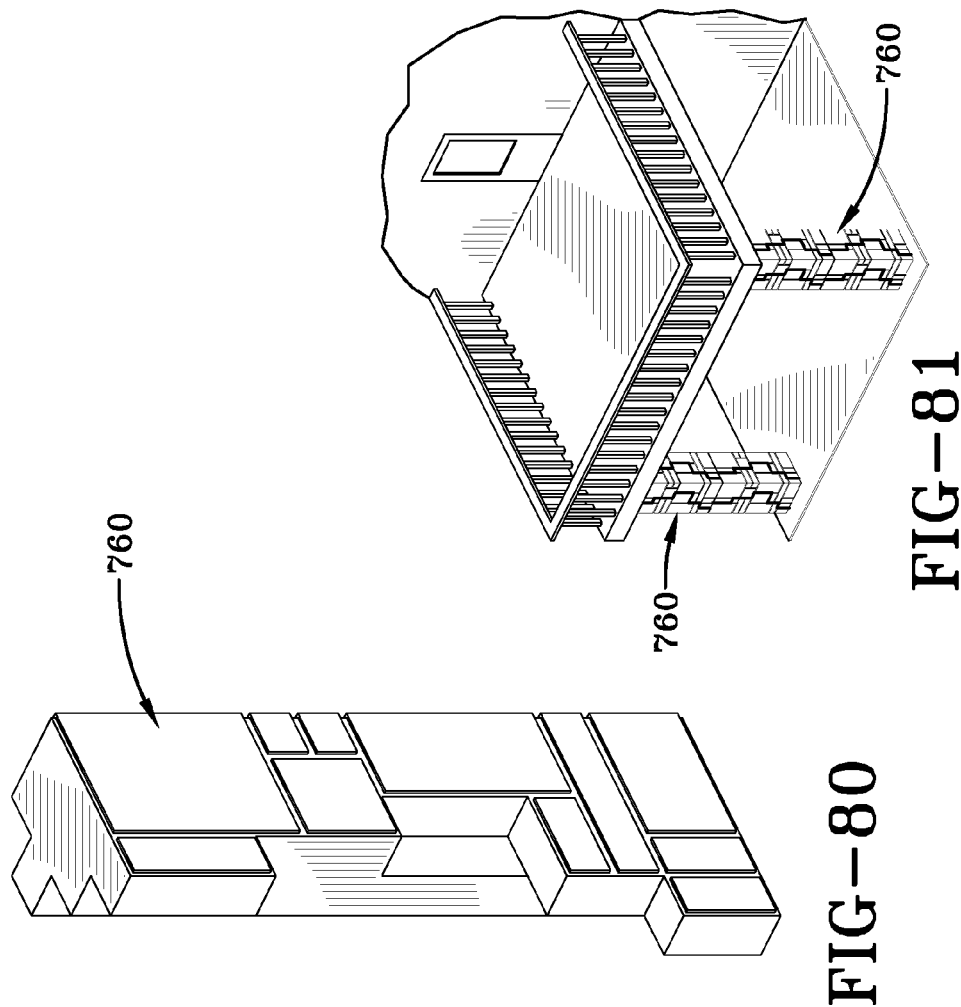
FIG-81
FIG-80
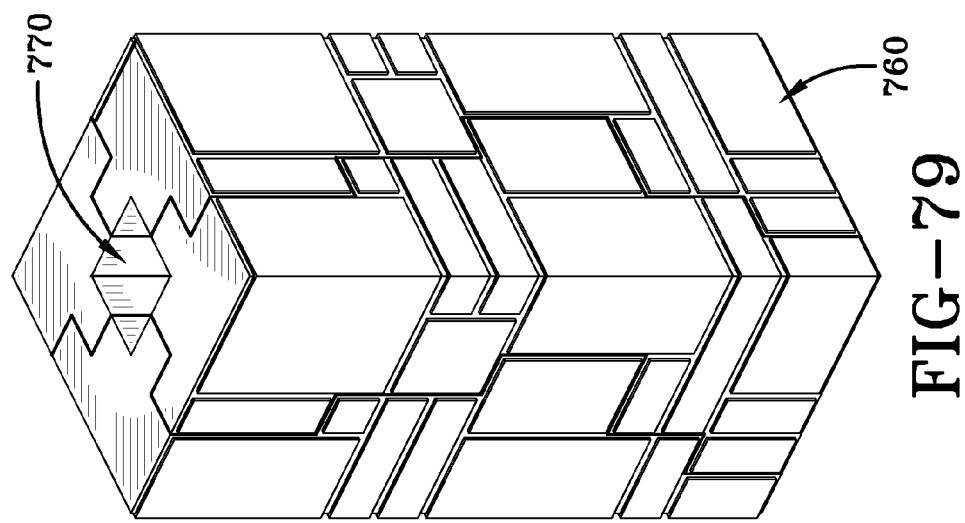
FIG-79

COMPOSITION OF MATTER

This application is a continuation-in-part of U.S. application Ser. No. 11/278,537, filed Apr. 3, 2006, which claims the benefit of U.S. Provisional Application No. 60/667,633, filed Apr. 1, 2005, and which is also a continuation-in-part of U.S. application Ser. No. 10/971,861, filed Oct. 22, 2004, which claims the benefit of U.S. Provisional Application No. 60/514,414, filed Oct. 24, 2003, each of which is hereby incorporated by reference in its entirety.

BACKGROUND AND SUMMARY OF THE INVENTION

Exemplary embodiments of the present invention relate to a composition of matter for producing various parts including claddings, sidings, panels, and other components such as for the building and construction industry. This technology may also be applied to producing other parts such as garden pots, pottery, containers, etc. Exemplary embodiments of the present invention also relate to methods of manufacturing synthetic panels and wall structures that simulate the appearance of other building products. For instance, exemplary embodiments of the panels and wall structures made from compositions of the present invention may simulate conventional building or construction materials such as panels and wall structures made from materials including, but not limited to, stone, brick, masonry, stucco, concrete, wood, other conventional building and construction materials, and combinations thereof.

It is known in the art that the construction of conventional stone and masonry objects, such as wall panels, columns, building facades, and the like are intrinsically heavy and cumbersome to handle due to the relatively high density of their components. Additionally, the manufacturing of stone products is likewise difficult and cumbersome because of the limiting nature of stones, binders, adhesives, etc., particularly in a mass production environment. Furthermore, such products may be sensitive to breakage during shipping and handling. What are needed are methods of fabricating relatively lightweight and physically robust product facsimiles of stone, masonry, brick, and other types of materials. Also needed are methods that minimize the limitations associated with the manufacture, distribution, and installation of real stone, masonry, brick, and other conventional structures.

Exemplary embodiments of the present invention may provide a composition of matter using the method of fabricating simulated stone, masonry, brick, or other textured products, such as panels or other structures. In one exemplary embodiment, molding techniques may be used to provide products having textural surface attributes that may simulate the appearance of actual stone, masonry, brick, or other conventional panels and structures. These exemplary products may be manufactured from formulations of materials that may include polymeric materials and other materials, as described later in this application. As a result, exemplary embodiments of the panels or other structures may be relatively lightweight, safer and easier to assemble into structures and products than the conventional materials being simulated, and easier to distribute and transport than the conventional materials being simulated.

Exemplary compositions of matter of this invention may be used for products and methods that may enhance the manufacturing, structure, appearance, assembly, installation, or function of synthetic building or construction products. In particular, some exemplary embodiments include methods of manufacturing relatively lightweight panels, wall structures, and other panel assemblies that may have contoured or textured surfaces to simulate the appearances of other building or construction products. For instance, some exemplary embodiments of panels, wall structures, and other panel assemblies may have contoured and textured surfaces that may simulate the appearances of conventional building or construction materials including, but not limited to, stone, bricks, masonry, concrete, stucco, wood, other conventional building materials, and combinations of any of these materials.

Parts made from an exemplary composition of matter of the present invention may be selected to suit a desired application. For instance, some exemplary embodiments of the present invention include methods of manufacturing panels that may have an improved configuration for obscuring the joint between adjacent panels when installed or for improving the transition to another building or construction material. In addition, some exemplary embodiments of the present invention include improved methods for manufacturing panels or other structures that are adapted to simulate other building or construction materials. For another example, some exemplary embodiments of the present invention may include improved structures or methods for improving ventilation or drainage.

As will be evident to those skilled in the art, articles made from exemplary embodiments of the present invention described herein are not intended to be limited to any particular synthetic building or construction products such as siding panels, fence panels, fence posts, roofing panels, or stand-alone walls, unless expressly claimed otherwise. It should be understood that exemplary embodiments of the present invention may be used to manufacture other type of products. Examples of such other products include, but are not limited to, landscaping planters, wishing wells, fountains, retaining wall fascia, marine docks, decorative rocks, toys such as castles and playhouses, storage sheds or bins, outdoor furniture, engineered retaining walls, columns, mailboxes, and other suitable products.

In addition to the novel features and advantages mentioned above, other features and advantages of the present invention will be readily apparent from the following descriptions of the drawings and exemplary embodiments.

BRIEF DESCRIPTION OF THE DRAWINGS

FIG. 3 is a front elevation view of a first exemplary embodiment of a field panel of the present invention.

FIG. 4 is a side elevation view of the field panel of FIG. 3.

FIG. 5 is a front elevation view of a second exemplary embodiment of a field panel of the present invention.

FIG. 6 is a side elevation view of the field panel of FIG. 5.

FIG. 21b is a front elevation view of the panel of FIG. 21a.

FIG. 21c is a front perspective view of the panel of FIG. 21a.

FIG. 21d is a rear perspective view of the panel of FIG. 21a.

FIG. 21e is a rear elevation view of the panel of FIG. 21a.

FIG. 22 is another rear elevation view of the panel of FIG. 21a.

FIG. 34 is a perspective view of an exemplary embodiment of a storage unit comprising a modular column of the present invention.

FIG. 35 is a perspective view of an exemplary embodiment of a storage unit comprising a modular column of the present invention.

FIG. 36 is a perspective view of an exemplary embodiment of a hose reel unit comprising a modular column of the present invention.

FIG. 37 is a perspective view of an exemplary embodiment of a storage unit comprising a modular column of the present invention.

FIG. 38 is a perspective view of an exemplary embodiment of a storage unit comprising a modular column of the present invention.

FIG. 39 is a perspective view of exemplary embodiment of stacked modular column of the present invention.

FIG. 79 is a perspective view of an exemplary embodiment of a four piece post wrap comprising the simulated stone panel of the present invention.

FIG. 80 is a perspective view of an exemplary embodiment of a four piece post wrap comprising the simulated stone panel of the present invention.

FIG. 81 is a perspective view of an exemplary embodiment of the four piece post wrap comprising the simulated stone material of the present invention.

DETAILED DESCRIPTION OF EXEMPLARY EMBODIMENT(S)

Figure 1:
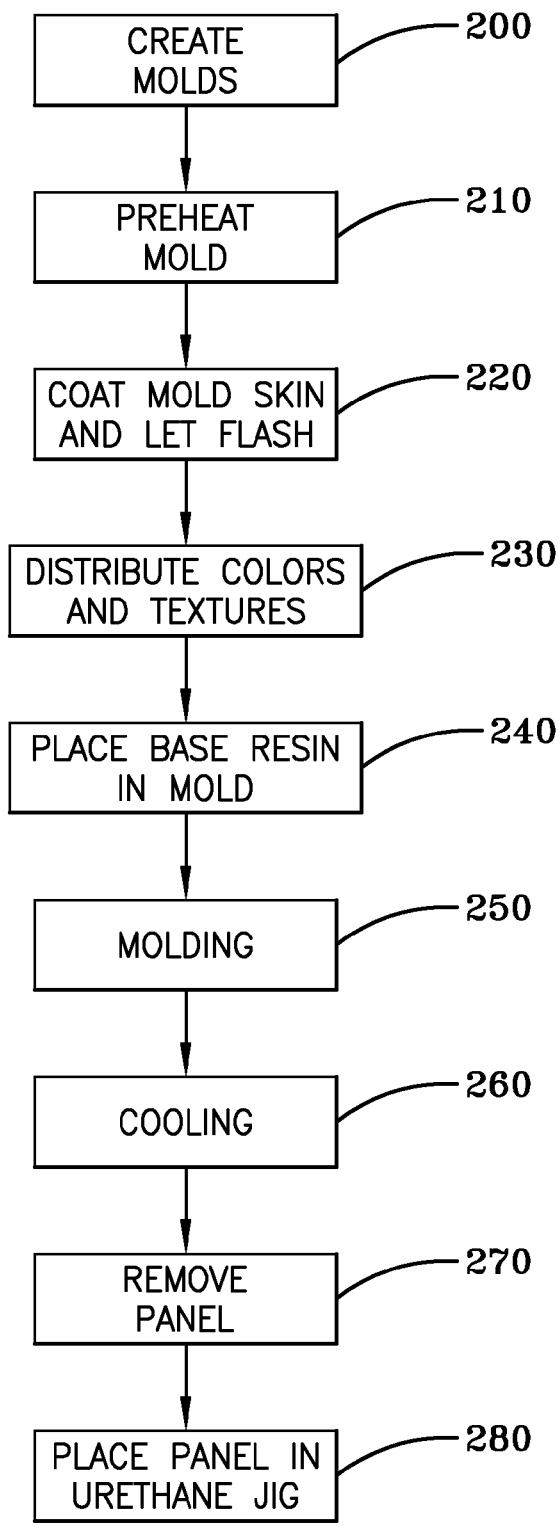
FIG. 1 is a block diagram of an exemplary step-wise molding process that may be used for manufacturing simulated stone and/or masonry and/or brick textured products.

Exemplary embodiments of the present invention include structures, compositions, and methods that may enhance the manufacturing, structure, appearance, assembly, installation, or function of synthetic building or construction products. Exemplary embodiments of the present invention include panels that may have contoured or textured surfaces adapted to simulate the appearances of other building products. For instance, exemplary embodiments of panels of the present invention may have contoured and textured surfaces that may simulate the appearances of conventional building or construction materials including, but not limited to, stone, bricks, masonry, concrete, stucco, wood, other similar or conventional building materials, and combinations of any of these materials.

Exemplary embodiments of the present invention may be used for compositions of matter for various applications. For instance, exemplary embodiments of panels include, but are not limited to, wall panels, fence panels, siding panels, other suitable types of panels, cladding and siding. As a result, exemplary embodiments of panels of the present invention may be used to make various types of barriers or structures such as walls, fences, siding assemblies, other types of panel assemblies, and any other suitable types of barriers or structures. This technology may also be applied to producing other parts such as chimneys, fence posts, garden pots, pottery, containers, mailboxes, etc.

Some exemplary simulated stone, masonry, and brick panels contemplated by the present invention may be formed via molding effectuated at temperatures between about 350-695° F., for example. In particular, to achieve the stone, masonry and brick panels and structures contemplated by some exemplary embodiments of the present invention, it may be useful to effectuate an exemplary multi-step manufacturing procedure depicted in the block diagram in FIG. 1. In step 210 of one exemplary method, a mold (manufactured in step 200, such as, but not limited to, a cast aluminum mold, which may be specially-designed) may be preheated in a molding-oven to an oven temperature in the range of about 350-750° F., and preferably to an oven temperature in the range of about 500-650° F., and more preferably to an oven temperature in the range of about 550-625° F. Other suitable temperatures may be utilized in other exemplary embodiments of the present invention. It has been found that, for example, the best results contemplated under one exemplary embodiment of the present invention may be obtained when the outside mold temperature is about 350-375° F. As will be understood by those skilled in the art, the temperature of the outside mold may be sufficiently elevated in the range of about 250-400° F. to enable flashing of the adhesive (e.g., a modified latex adhesive). It should be understood that the term "flashing" is meant to correspond to substantially removing all of the water from a water-based adhesive so that only solids remain; this, of course, may avoid the adverse formation of steam in the mold as heat is applied thereto in an exemplary method of the present invention. It should be noted that the adhesive may be selected from, but not limited to, water-based adhesives, solvent-based adhesives, two-part reactive systems, and other similar or suitable adhesives. In exemplary embodiments, adhesives may be used singularly or as an admixture.

After the mold is preheated as hereinbefore described in FIG. 1, the mold may be opened in step 220 to provide access to its face for placement of adhesives, color components, and texture components. More particularly, in an exemplary method with the mold now opened, the face of the mold may be lightly coated with adhesive and allowed to set until the glue flashes or becomes tacky to touch. One example of a glue found to be effective for the purposes of one exemplary embodiment of the present invention is Henkel MM 8-15-1. Another is Forbo PA245-2N. Additionally other mold release and/or process aids may be added at this stage, either in the glue or separately. Examples of these include, but are not limited to Plastistrength® 770 process aid from Arkema, polyethylene waxes (microcrystalline and/or micronized) such as A-C® 9, A-C® 617A, ACumist® C-18 and/or ACumist® 112. For example, it has been found to be particularly effective to spray latex adhesive using an airless spray means in such quantity to assure the in situ retention of coloring pigments and texturing materials. Ergo, it should be clear that a preheating step of an exemplary method may be incorporated in an exemplary manufacturing process to enable a modified latex adhesive to be flashed-off the mold surface. That is, an exemplary preheating step may cause the water portion of the adhesive to evaporate, thereby leaving a solid residue for retaining coloring pigments and texturing materials (which may be added in step 230) in place while a resin is melting and being formed into a wall panel, for example, such as contemplated by an exemplary embodiment of the present invention.

In the step depicted in the example of FIG. 1 as step 230, a panoply of colors and texturing materials corresponding to the stones and/or masonry and/or bricks and/or other desired substrates being simulated may be selected. Color pigments and texturing components may be applied in any suitable manner such as described herein to at least one face (e.g., one face, two faces, or 3 or more faces) of the mold wherein these components may become embedded with or integrated into or otherwise secured by the adhesive to provide color pigments and textures in association with at least one surface of the panel. Examples of pigments may be selected from, but not limited to, weatherable, light stable, organic, and/or inorganic pigments or any other similar or otherwise suitable pigments. In one exemplary method of the present invention, it will be understood that a dry shake method or the like may be used on the basis that the color pigments and texturing components may optionally be in powder form, preferably with mesh sizes of no more than the range 10-60. In another exemplary embodiment, the color components and texture components may optionally be introduced as a pre-blended composition before the molding step or introduced as an admixture with the herein described resin charge before the molding step. The color components and texture components may also optionally be provided in a film construction which may allow a quicker and more efficient introduction of such materials into the mold.

In an exemplary method a light layer of adhesive may applied to the panoply of colors and texturing materials corresponding to the stones and/or masonry and/or bricks and/or other desired substrates being simulated. It has been found to be particularly effective to spray latex adhesive using an airless spray means in such quantity to assure the retention of coloring pigments and texturing materials. The adhesive may be allowed to set until the glue flashes or becomes tacky to touch. In one exemplary embodiment of the present invention, an additional background shake of the coloring pigments and texturing materials may be applied in any suitable manner such as described herein. These components may become imbedded with or integrated into or otherwise secured by the adhesive to provide another layer of color pigments and textures.

The mold surface may be optionally masked to prevent adherence of color pigments and textures to selected mold face regions to create a different visual appearance of the panel. Additionally, the mold may be configured to integrate or provide the manufactured panel with functional inserts, thereby promoting easier mechanical assembly and installation. Examples of functional inserts include, but are not limited to, openings or receptacles adapted to receive or engage screws, nails, bolts, or any other similar or suitable mechanical fasteners.

Referring to one exemplary simulated stone and/or masonry and/or brick textured wall panel as an illustrative panel that may be manufactured by the techniques taught by an exemplary method of the present invention, it has been found that providing color pigments and texturing components in a range of about 5-20% of the total weight of a base resin may provide desirable results for some exemplary embodiments of simulated stone, masonry, and brick panels.

Again, using an exemplary simulated stone and/or masonry and/or brick wall panel for illustrative purposes, it will become evident that an example of a completely formulated and manufactured wall panel may comprise base resin, color pigments and texturing components, and adhesives.

Thus, to produce such an exemplary wall panel, in step 240 of this exemplary method of FIG. 1, the mold may be loaded with a base resin charge (e.g., polyethylene) optionally in conjunction with other polymers and oxide pigments. As previously described with regard to step 230, color hardener, such as a Coloration Systems hardener, comprising graded silica aggregates, cement, and mineral oxide pigments, may have been previously applied to the face of the mold using a dry shake method, for instance, in one exemplary method of the present invention.

Next, in step 250 of FIG. 1, the mold may be closed and prepared for a molding cycle (e.g., rotational molding or compression casting). While, of course, any molding apparatus may suffice, it may be preferable to effectuate the molding process (step 250) using a casting oven, a rotational molding apparatus, or any other similar or suitable apparatus. As will become evident to those skilled in the art, the oven temperature in one exemplary method may be about 500° F.-650° F., preferably for sufficient time for the resin to become stable. It should be noted that the introduction of materials (e.g., pigments, aggregates, or any other similar or suitable materials) that may, for example, be used to simulate stone colors and textures may optionally be applied as a post step relative to the panel molding step.

In step 260 of FIG. 1, as should be clear to those skilled in the art, the molded material may then be subjected to a cooling cycle in the mold, in a conventional cooling jig, or in another suitable cooling system wherein the uniform shape thereof may be sustained. For instance, in one exemplary method of cooling, the molded product may be subjected to blown air, water (e.g., spray mists), or alternating cycles of blown air and water. Next, in one exemplary method, the cooled product may be removed from the mold in step 270 and placed in a reinforcing form in step 280 of FIG. 1. In step 280 of FIG. 1, a foam backer may optionally be applied to the cooled panel, for example, by a foam injection step adapted to provide shape retention and sound deadening properties to the simulated stone panel. If a hollow panel (i.e., a panel having a rear cavity or a generally concave rear surface) is fabricated, the hollow or back portion of the panel may optionally be filled with polyurethane foam or any other similar or suitable foam after the molding step. For example, foam may be applied such as by injection or applying a backing panel. The foam backer may optionally be applied to the panel during the molding process. Polyethylene foam may be applied to the panel during the molding process. The polyethylene foam may also be applied to the cooled panel, for example, by a foam injection step. Expanded polystyrene may also be used as a foam backer; the expanded polystyrene may be applied during the panel molding process or applied to the cooled panel by a foam injection step. The inclusion of a foam backer may provide improved thermal insulation, improve sound damping, increased rigidity, and improve dimensional stability as a function of temperature changes.

In another exemplary embodiment of the present method, the mold service may be blown with compressed air before decorating each part. The residue may then be cleaned off the parting line before molding each part. The vent tubes may also be cleaned and properly inserted before molding each part. A light glue layer may be sprayed to a light tack on the empty stone mold. The stones may then be decorated with colors and aggregates so that different stones on each panel may receive different colors, and ensuring that the same stones do not receive the same coloring each time. An example of this would be to blend two colors half and half on a stone. Next a light glue layer may be sprayed again. A background shake may then be applied over the entire surface of the mold. The background shake may include, but is not limited to, sand, concrete aggregates, and other natural materials. A final glue layer may then be added followed by charging of the colored resin. To produce a 7.3 square foot panel in this manner, a 10 lb. mix of a high density polyethylene (HDPE) copolymer with a melt index (Ml) of 2.0 g/10 min. and a specific gravity of 0.945 g/ml resin containing 0.22% of color concentration may be used. After closing the mold, it may be moved into an oven set at 515° F. and rotationally molded with bi-axially oriented rotation for 15 minutes. After 15 minutes, the mold may be moved to the cooling chamber after the outside of the mold reaches a maximum of 385° F. The mold may then be allowed to cool for an additional 15 minutes and the simulated stone panel may be de-molded at 150° F. This process may be repeated with multiple spiders each of which may contain 4 molds, so that 32 panels may be produced in an hour. The above method reduces the steps used to produce a simulated stone panel with more flexibility to create different products with differing performance criteria due to wider variety of raw materials, improved aesthetics, improved consistency, higher productivity, and less pin holes in the finished product.

Exemplary embodiments of the present invention may use a resin of HDPE copolymer from Basell with a 6.8 Ml and specific gravity of 0.948 g/ml. The Ml for polyethylene is measured at 190° C. and a weight of 2160 g. This resin may be used to produce a column from which a fence post was formed. The column may also be used to produce a mail box.

Exemplary embodiments of the present invention may combine the higher rigidity of HDPE homopolymer with a 6 Ml and a specific gravity of 0.960 g/ml, with the impact properties of a polyethylene plastomer with a 0.5 Ml and density of 0.905 g/ml at a ratio of 3:1. This combination provides higher rigidity with improved impact properties for specialty applications.

Exemplary embodiments of the present invention may use 20% finely ground (<50 mesh) powder of recycled polyethylene combined with 80% HDPE with a 6.8 Ml and specific gravity of 0.948 g/ml. This procedure reduced costs as well as providing the ability to use recycled materials that would have otherwise have gone to a landfill. This advantageous from a cost and environmental perspective.

In another exemplary embodiment of the present invention a finely ground (<40 mesh) copolymer polyethylene such as Basell's Pro-fax™ 7523 may be used. Pro-fax™ has a melt flow rate of 4 g/10 min. measured at 230° C., a notched Izod impact strength of 1.8 ft-lb/in, and a flex modulus of 180 psi. To achieve the desired results the oven temperature may need to be raised to 600° F., while the mold surface may attain a maximum of 400° F.

Another exemplary embodiment of the present invention may utilize a PVC powdered suspension resin compound such as Pevikon™ custom grades as well as PolyOne vinyl powder in nickel coated molds. These products are available from PolyOne Corporation. The PVC may be custom stabilized to prevent degradation due to much larger residence time compared to typical profile extrusion or injection molding. Typical temperatures may be an oven temperature of 400° F. with the mold surface temperature of 315° F. Acrylic glue may be used as it is compatible with the PVC rather than a SBR based glue typically used with a polyolefin resin to make the simulated stone panels or parts.

Exemplary embodiments of the present invention may also use a PVC slush molding compound such as vinyl plastisols available from PolyOne Corporation. Because of the liquid content the mold may need additional gasketing as well as increased venting on the mold. The gasketing may be made of Neoprene. Typical temperatures would be an oven temperature of 400° F. with a mold surface temperature of 325° F. The thermoset polyurethane may also need modification such as the addition of another component, based on a polyurea resin which may provide excellent UV weathering resistance compared to conventional aromatic polyurethane.

In another exemplary embodiment of the present invention a two-part foamed polyurethane liquid formulation may be used instead of the slush molding. The use of two-part foamed polyurethane may reduce the cycle time from 50-60 minutes to about 12 minutes. In addition, silicone rubber molds may be used instead of the expensive metal molds. This would greatly increase productivity as metal molds take weeks to manufacture. The foaming agent to polyurethane ratio may be adjusted to arrive at a density of 2 lb/cu ft to 40 lb/cu ft depending upon the strength and weight of the part or panel desired.

Exemplary embodiments of the present invention may also include the use of a two-stage foamed polyurethane, where initially a higher density (15 lb/cu ft) polyurethane foam may be used to obtain a hard scratch resistant skin about 50 to 300 mil thick, followed by adding a much lower density (1 to 2 lb/cu ft) polyurethane foamed compound to fill out the exterior of the panel or part. A polyurea coating may be used to hold the color aggregates. This combination of composites provides a simulated stone panel or part with low overall weight, but with a hard tough scratch and UV resistant skin with an aesthetic exterior with good impact performance. This combination may be used to produce columns, column caps as well as accessories such as window lineals, window sills and water tables with different textures, colors and looks.

In another exemplary embodiment of the present invention size reduced recycled materials such as carpet fiber scraps (post-industrial or post-consumer) and recycled thermoset scraps may be added to the polyurethane in about 10% to 60%. The use of recycled materials may cut costs and provide environmental benefits.

Examples of panels that may simulate the appearance of masonry are shown in FIGS. 2 through 10. In these examples, the panels are adapted to simulate the appearance of masonry that is comprised of stones (such panels may also be referred to as simulated stone panels). In some other exemplary embodiments, panels may be adapted to simulate the appearance of masonry that may be comprised of any additional or alternative substrate including, but not limited to, bricks and any other substrate material that is suitable for masonry. Referring to FIGS. 2 through 10, each of the panels has at least one edge in which the synthetic stones are not evenly aligned. In other words, the synthetic stones do not form a straight line along at least one edge of the panel. Instead, at least one stone juts out relative to the other stone(s) along at least one edge of the panel. For example, referring to FIG. 2, panel 30 is comprised of a simulated stone 32 and a simulated stone 34 that jut out relative to the other stones along a top edge 36 of panel 30. In this example, simulated stones also jut out relative to the right and left side edges of panel 30. It should be recognized that stones may jut out in other suitable manners. For example, a jutting relationship may also be accomplished by providing at least one stone with a configuration such that a portion juts out (e.g., a L-shaped or T-shaped stone). Of course, it should be recognized that the same type of effect may be achieved with other exemplary embodiments of the present invention that simulate other building or construction materials (e.g., brick).

Figure 2:
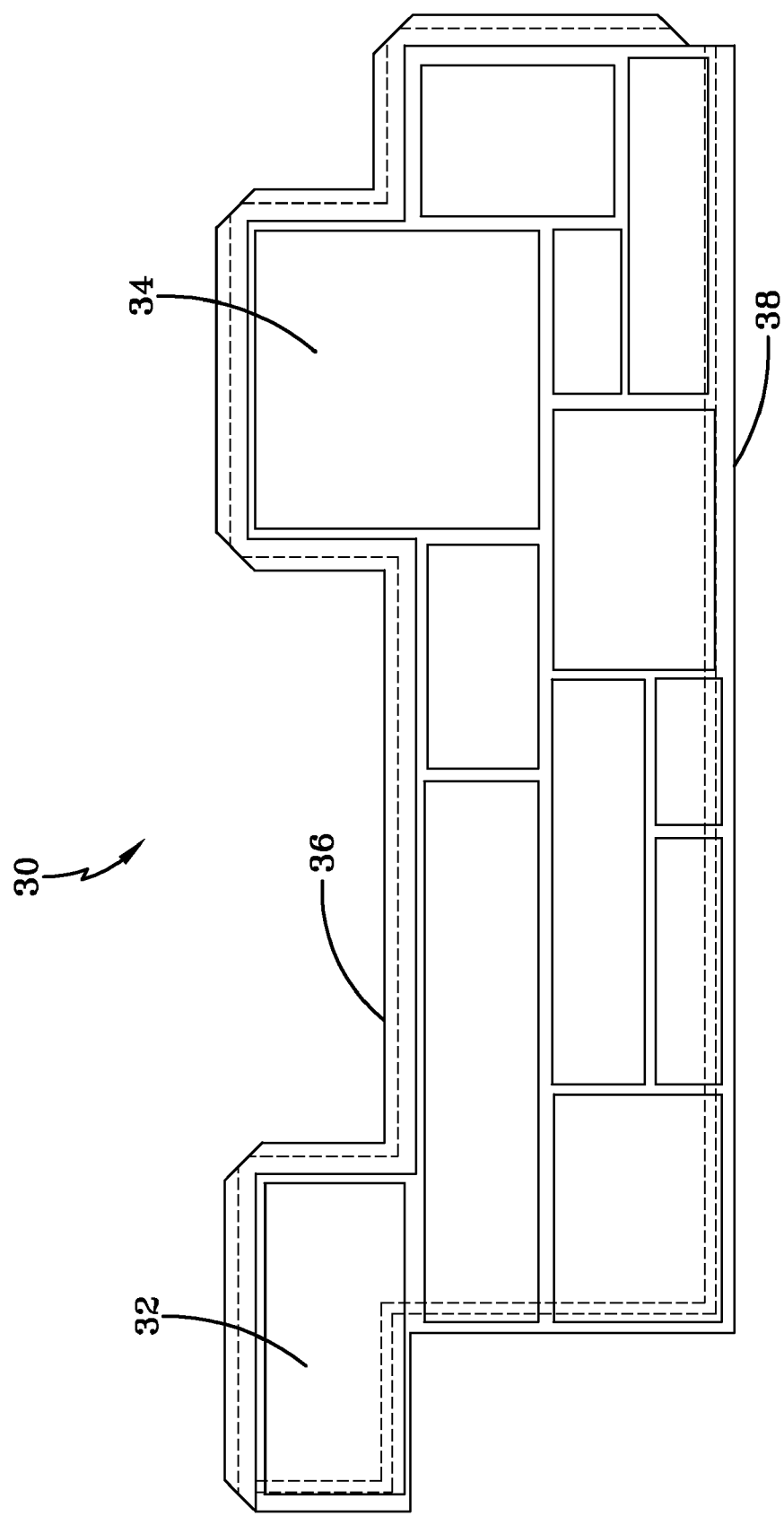
FIG. 2 is a front elevation view of an exemplary embodiment of a starter panel of the present invention.
Figure 10:
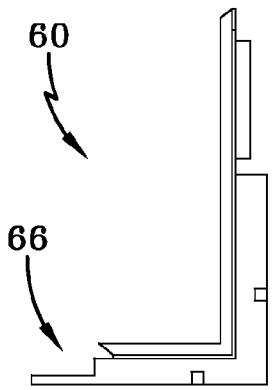
FIG. 10 is a second top plan view of the corner panel of FIG. 7.
Figure 8:
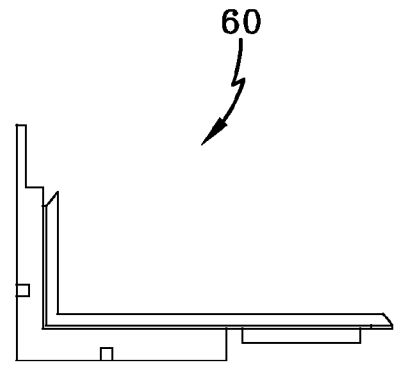
FIG. 8 is a top plan view of the corner panel of FIG. 7.

More particularly, FIG. 2 shows an example of a starter panel 30. The starter panel has a substantially straight bottom edge 38. For example, substantially straight bottom edge 38 may be useful if the panel is situated adjacent to the ground or in other installations in which a straight edge is desirable. Similarly, an uppermost panel (i.e., a finishing panel) may have a substantially straight top edge, if desired.

FIGS. 3 through 6 show examples of field panels. More particularly, FIGS. 3 and 4 show field panel 40, and FIGS. 5 and 6 show field panel 50. At least one simulated stone along each edge of these panels juts out relative to the other simulated stones. For example, with reference to FIGS. 3 and 4, at least one simulated stone juts out relative to at least one other simulated stone along top edge 41, bottom edge 42, left edge 43, and right edge 44, respectively, of field panel 40. It should also be recognized that panel 40 and panel 50 may optionally have substantially the same overall shape. However, the configuration of the synthetic stones in each panel is different. In particular, simulated stone configuration 46 of panel 40 is different than simulated stone configuration 56 of panel 50. As a result, these exemplary panels may be used in the same panel assembly (e.g., a wall structure), and the different configurations of the synthetic stones may further help to obscure the joints between adjacent panels. In other words, the panels may be used to prevent a repetitive pattern of the synthetic stones, which may make it more difficult to distinguish the individual panels of the panel assembly. The other panels of the present invention may also incorporate this feature to prevent a repetitive pattern of the synthetic stones.

Figure 9:
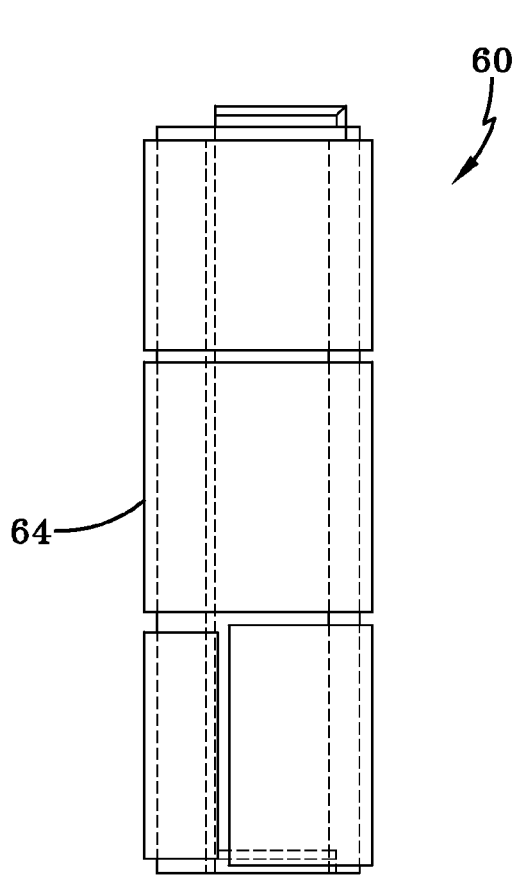
FIG. 9 is a second side elevation view of the corner panel of FIG. 7.
Figure 7:
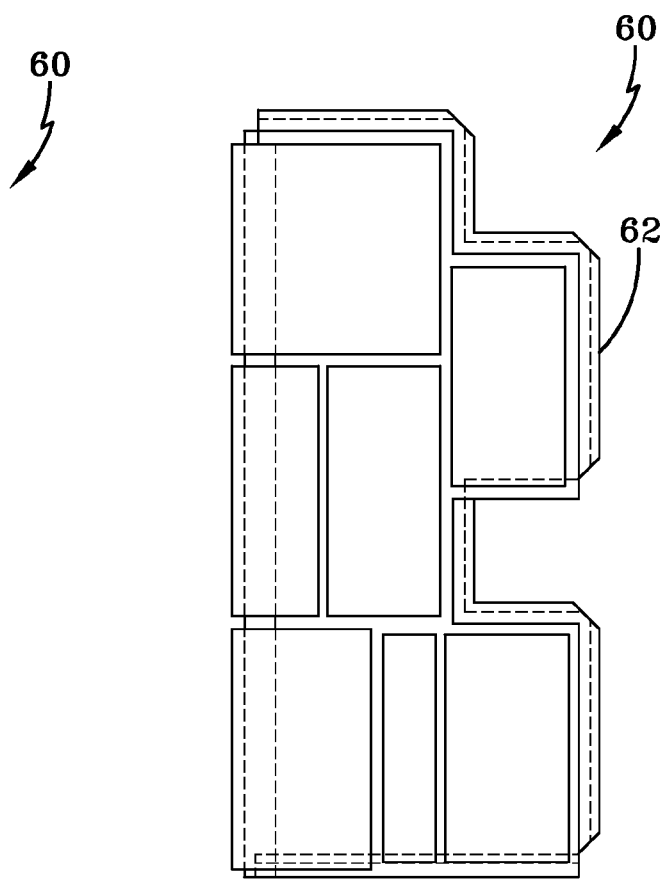
FIG. 7 is a first side elevation view of an exemplary embodiment of a corner panel of the present invention.

FIGS. 7 through 10 show an example of a corner panel 60 of the present invention. In this example, at least one simulated stone may jut out relative to at least one other simulated stone along edge 62 of corner panel 60 such as shown in FIG. 7. Furthermore, such as shown in FIG. 9, the synthetic stones along edge 64 of panel 60 may optionally be evenly aligned. Edge 64 may include a pocket or recessed portion 66 for receiving, engaging, or otherwise overlapping the edge of another panel or panels. Nevertheless, it should be recognized that at least one synthetic stone along such an edge may jut out, if desired, in other embodiments of the present invention.

FIGS. 11 through 17 show exemplary installations using panels and components of the present invention. In an exemplary installation, adjacent panels may be connected together in any suitable manner. For example, such as described above, a pocket or recessed portion of one panel may receive, engage, or otherwise overlap an edge of another panel or panels. For instance, an edge or flange of one panel may be inserted into a pocket or recessed portion of another panel to interlock the panels together. Optionally, fasteners may be used to connect adjacent panels together. Examples of fasteners include, but are not limited to, mechanical fasteners (e.g., screws, nails, pins, clamps, etc.), fabric fasteners (e.g., VELCRO and other hook and loop fastening materials), adhesives, glues, epoxies, polymers, tapes (e.g., pressure sensitive adhesive tapes), and other similar or suitable attachment materials.

Figure 11:
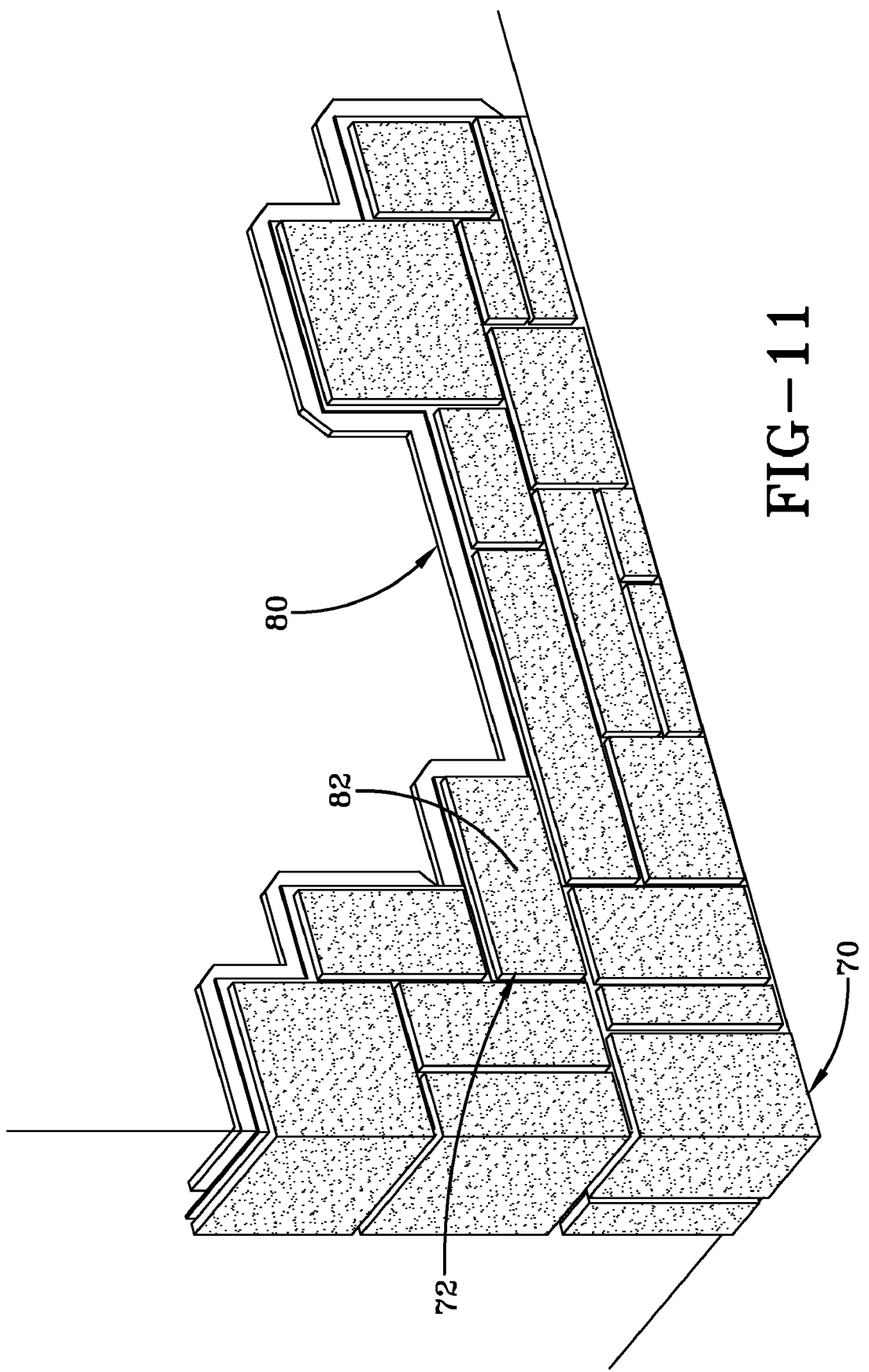
FIG. 11 is a perspective view of an exemplary embodiment of a wall structure of the present invention that comprises a corner panel and a starter panel.
Figure 12:
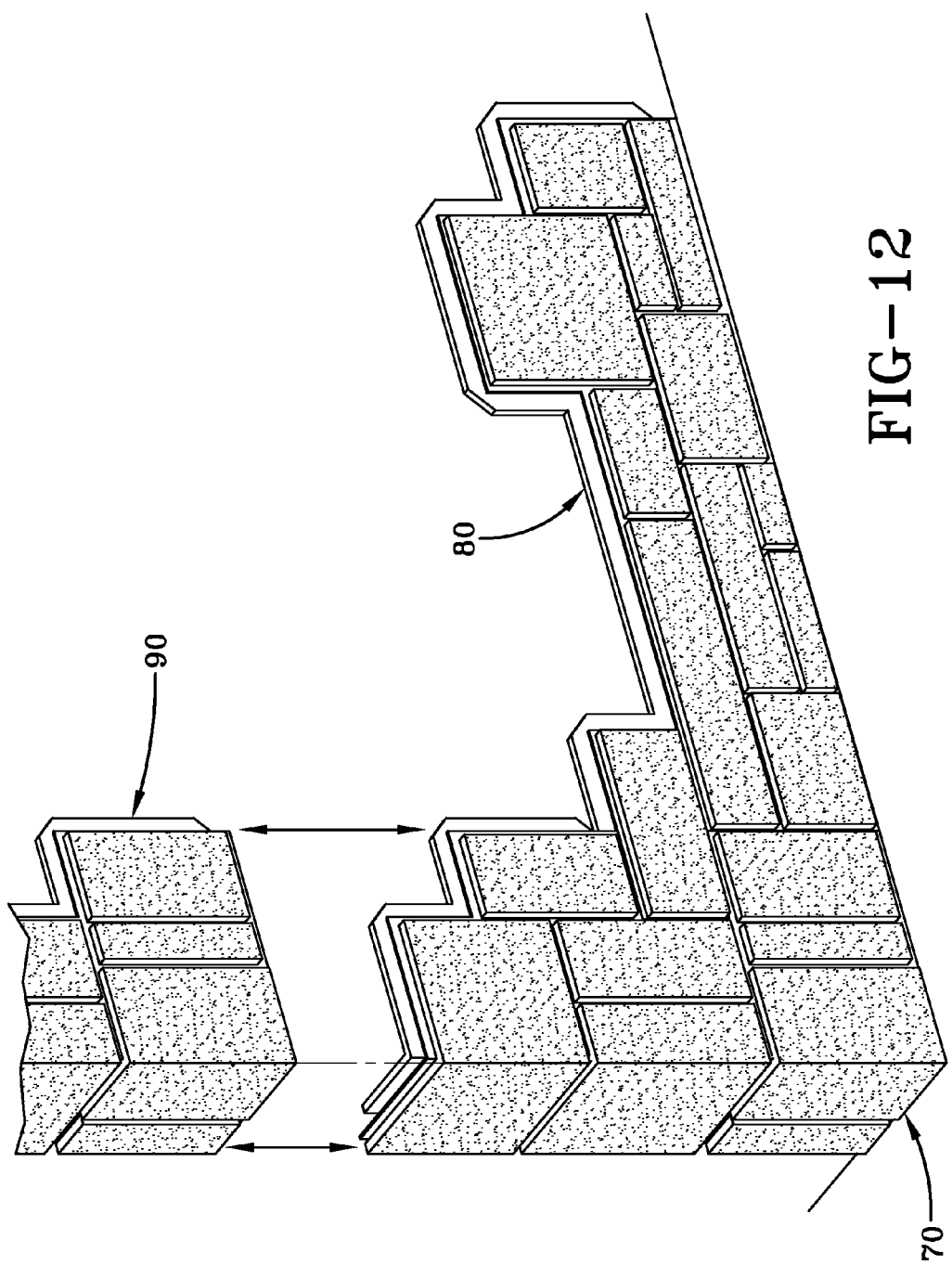
FIG. 12 is a perspective view of an exemplary embodiment of a wall structure of the present invention that shows how corner panels may be stacked.
Figure 13:
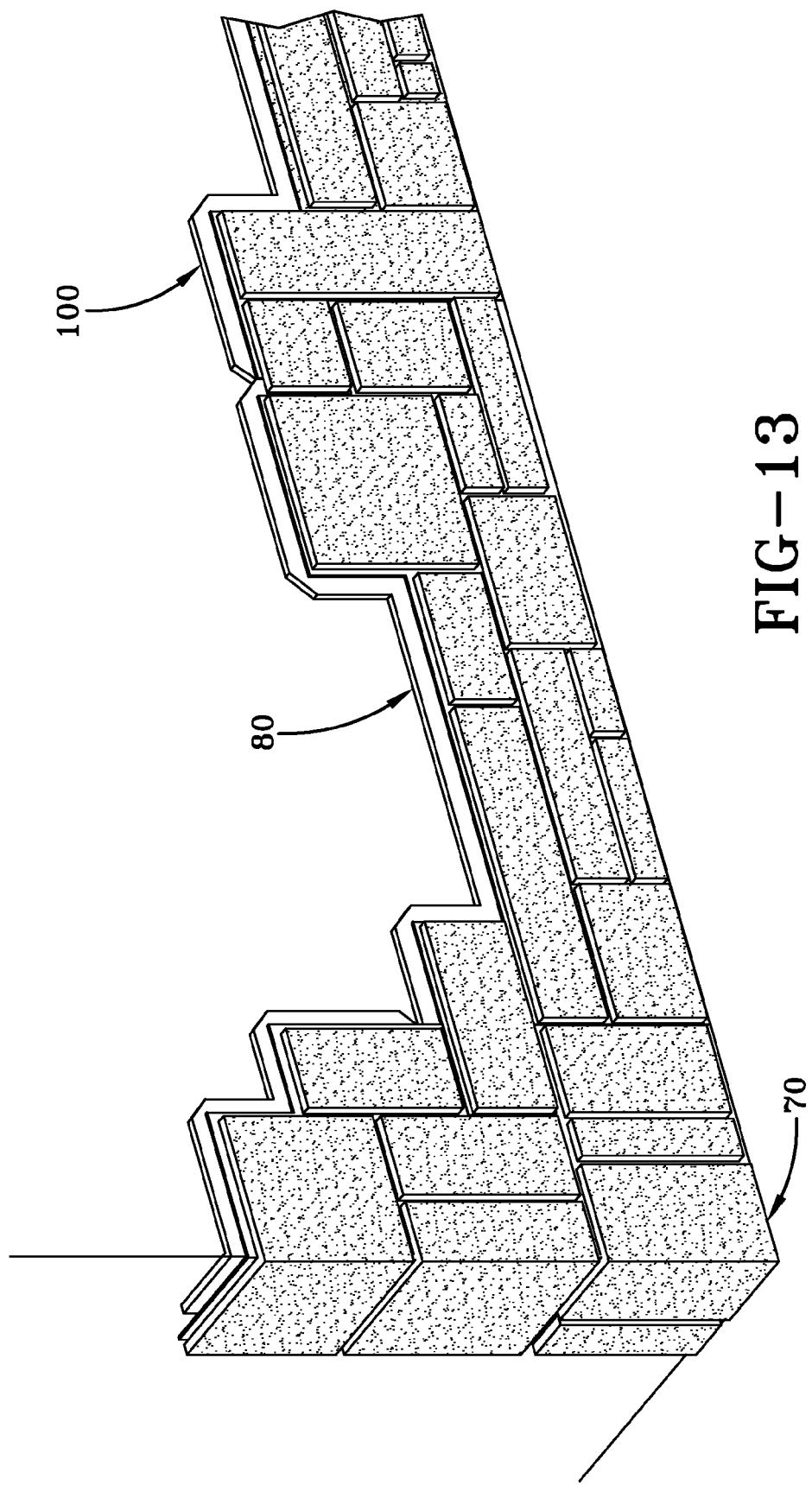
FIG. 13 is a perspective view of an exemplary embodiment of a wall structure of the present invention that shows how starter panels may be connected.
Figure 14:
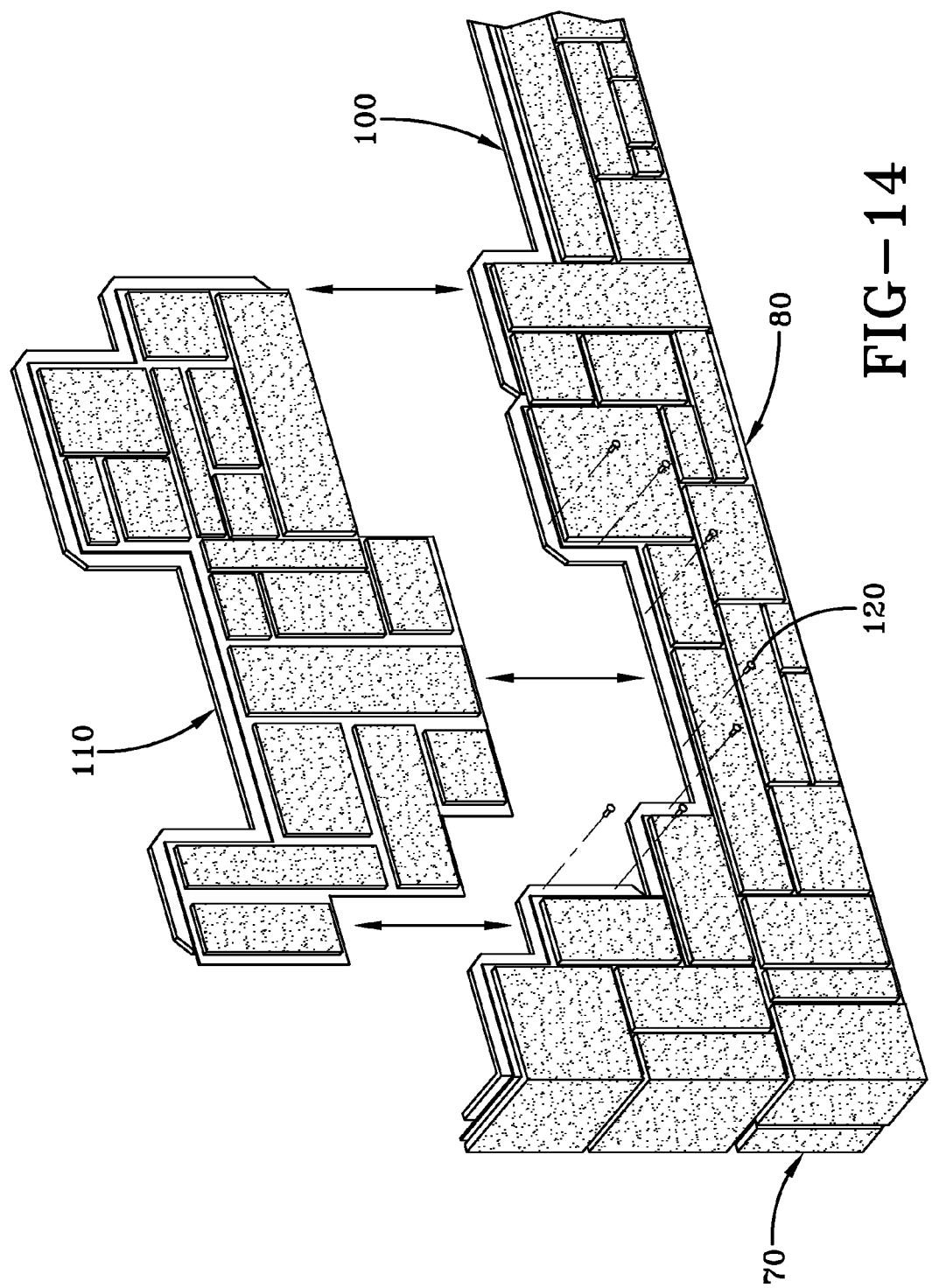
FIG. 14 is a perspective view of an exemplary embodiment of a wall structure of the present invention that shows how a field panel may be connected with a corner panel and a starter panel.

In one example, FIG. 11 shows an exemplary embodiment of a corner panel 70 connected to an exemplary embodiment of a starter panel 80. In particular, a jutting simulated stone 82 of starter panel 80 extends into a recessed portion 72 of an edge of corner panel 70, which may assist in making it more difficult to see or notice a joint between the panels. Such as shown in FIG. 12, another corner panel 90 may be stacked on corner panel 70 in this exemplary embodiment. FIG. 13 shows another exemplary embodiment of starter panel 100 connected to starter panel 80. It should be noted that starter panel 100 has a different simulated stone configuration than starter panel 80 in this example. FIG. 14 shows an exemplary embodiment of a field panel 110 stacked on corner panel 70, starter panel 80, and starter panel 100. Such as in this example, stacking a panel on more than one other panel may also assist in making it more difficult to see or notice a joint between the panels. Furthermore, FIG. 14 shows an example of how fasteners 120 may be inserted through fastener surfaces or functional inserts of each of the underlying panels to facilitate securing the underlying panels to a base structure.

Figure 15:
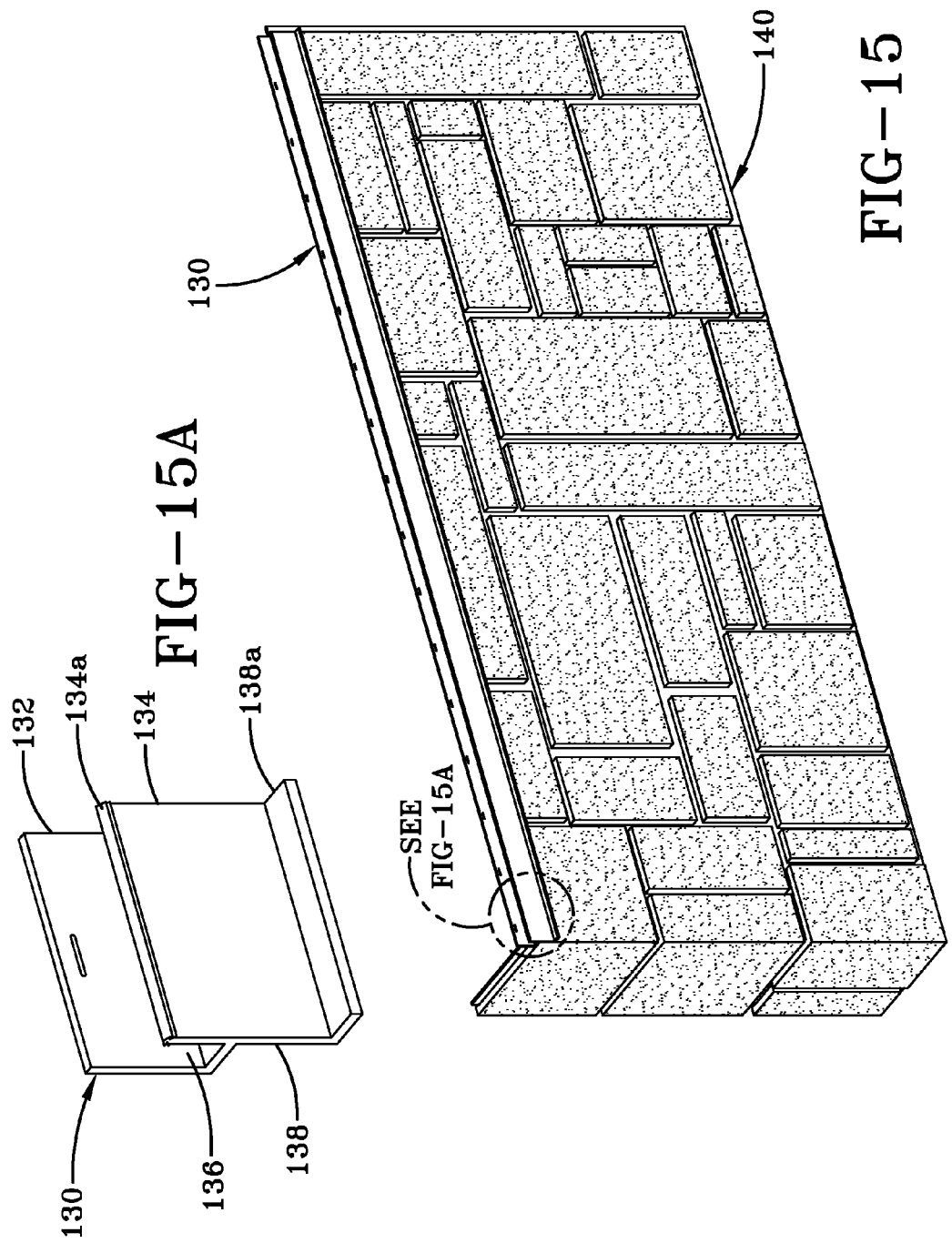
FIG. 15 is a perspective view of an exemplary embodiment of a wall structure of the present invention that utilizes a cap cup (a detailed view of this exemplary embodiment of a cap cup is also provided).

FIG. 15 shows an example of a cap cup 130 that may be used along an edge of a panel assembly or wall structure 140. A cap cup may be made in any suitable manner including, but not limited to, extrusion, injection molding, compression molding, and any other suitable type of molding. As shown in FIG. 15, cap cup 130 may include a flange 132, which may optionally include an aperture for receiving a fastener that may be used to secure cap cup 130 to a base structure. In this exemplary embodiment, flange 132 may be substantially L-shaped. A male connector portion 134 may extend upwardly from a proximal portion of flange 132 such that a channel 136 may be formed between flange 132 and male connector portion 134. Optionally, male connector portion 134 may include a tip 134a comprised of at least one flange. For instance, such as shown in this example, tip 134a may be shaped like an arrow. Optionally, tip 134a may be comprised of a flexible plastic material to facilitate connection with another component. Furthermore, a bottom portion 138 may optionally extend downwardly from a proximal portion of flange 132. Bottom portion 138 may be substantially L-shaped such that a flange 138a may assist with supporting another component.

Figure 16:
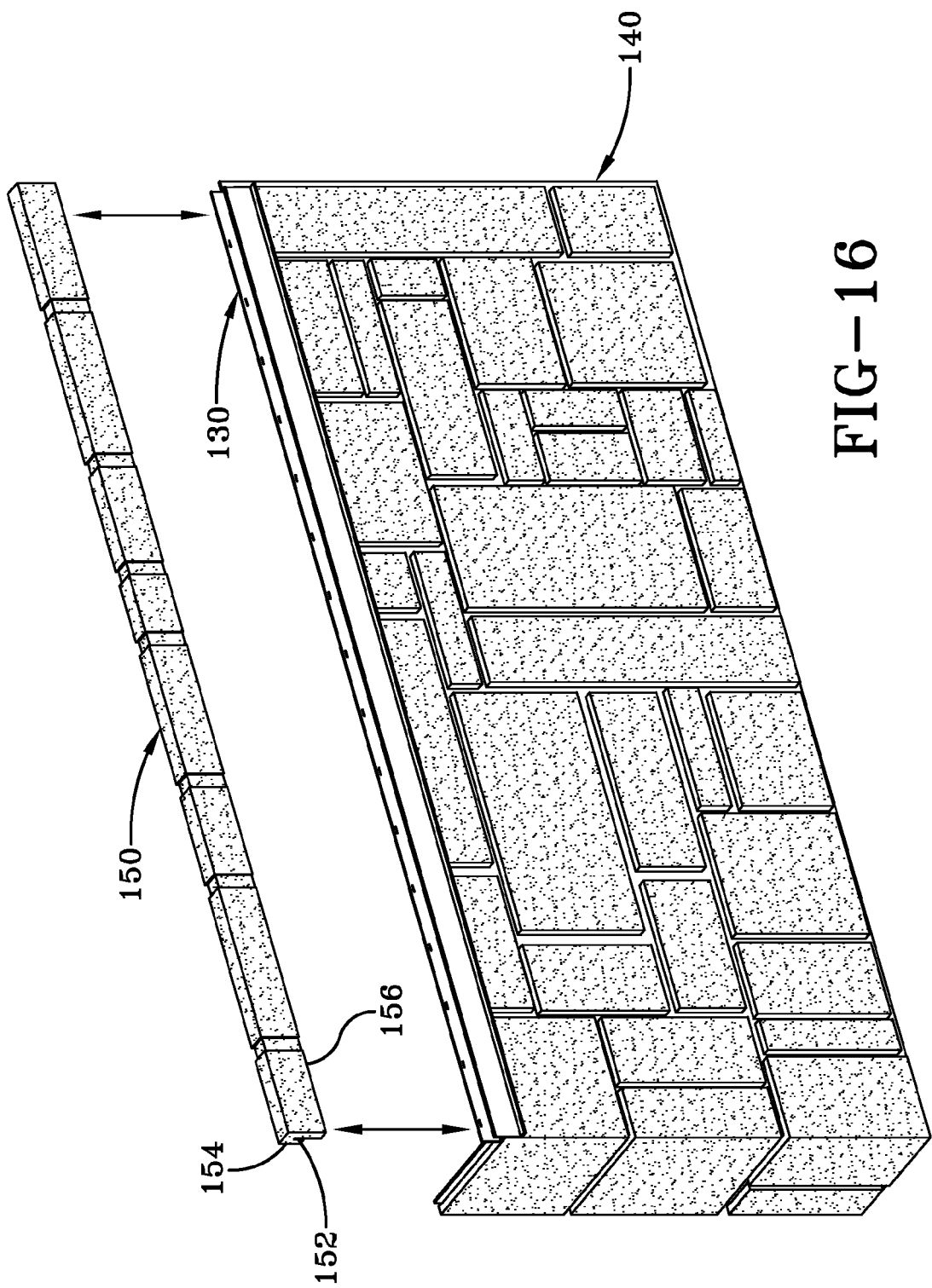
FIG. 16 is a perspective view of an exemplary embodiment of a wall structure of the present invention that shows how a cap trim block may be positioned on a cap cup.
Figure 17:
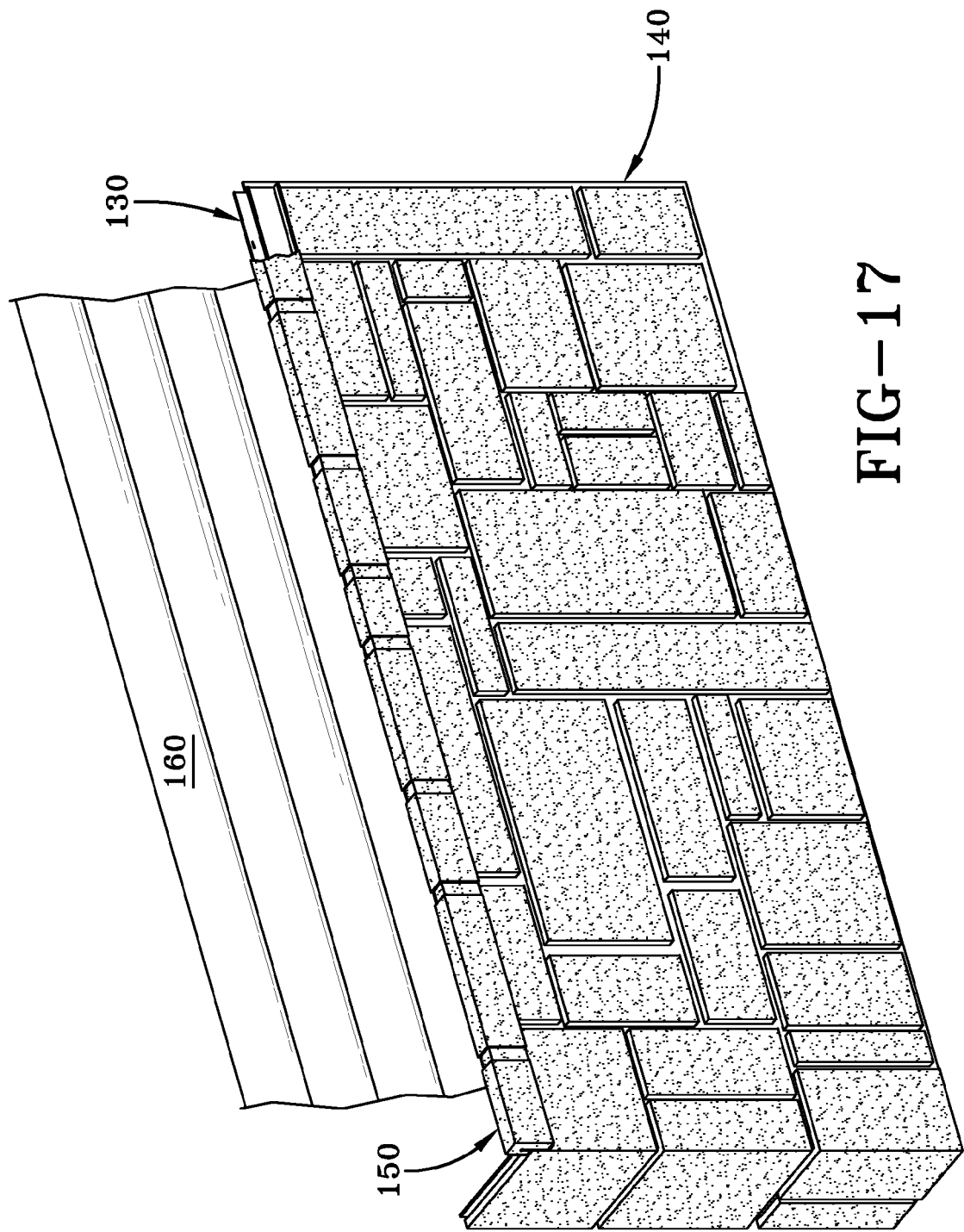
FIG. 17 is a perspective view of an exemplary embodiment of a wall structure of the present invention that shows how a cap trim block may be used as a transition between a wall structure and another building material.

As an example, FIG. 16 shows of how cap cup 130 may facilitate connection with another component. In particular, such as shown in FIG. 16, a cap trim block 150 may be provided on or positioned over cap cup 130. In an exemplary embodiment, a cap trim block may be made in a similar manner as an exemplary embodiment of a panel of the present invention. Referring to FIG. 16, cap trim block 150 may include a female connector portion 152 that is adapted to receive male connector portion 134 of cap cup 130. Optionally, female connector portion 152 may include at least one inner ridge adapted to engage tip 134a of male connector portion 134 such that an interlocking connection may be formed. When female connector portion 152 of cap trim block 150 receives male connector portion 134 of cap cup 130, a rear portion 154 of cap trim block 150 may be received in channel 136 of cap cup 130, and a front portion 156 of cap trim block 150 may extend over bottom portion 138 of cap cup 130 such that it may optionally rest on flange 138a. Thus, cap trim block 150 may be used to provide a desired edge to wall structure 140 such as shown in FIG. 17. In addition, it may also provide a desired transition to another building material, such as siding 160 as shown in FIG. 17. In other embodiments, a cap trim block may be used to provide a desired transition to other building materials such as stucco, bricks, concrete, wood planking, or any other building or construction materials.

It should be also recognized that FIGS. 15 and 16 merely show one example of a cap cup and a cap trim block, respectively. Other configurations of a cap cup and a cap trim block are possible such that a cap trim block may be provided on a cap cup. For example, a cap cup may include a female connector portion that is adapted to receive a male connector portion of a cap trim block.

Figure 18:
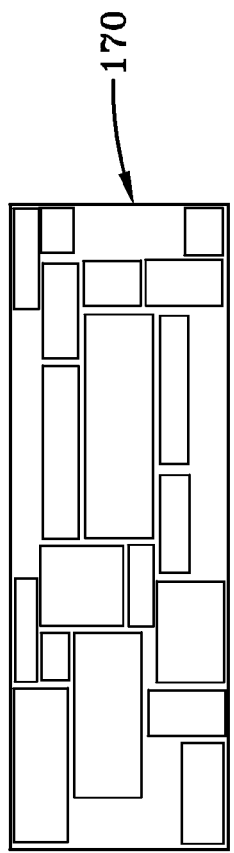
FIG. 18 is a front elevation view of another exemplary embodiment of a panel of the present invention.
Figure 19:
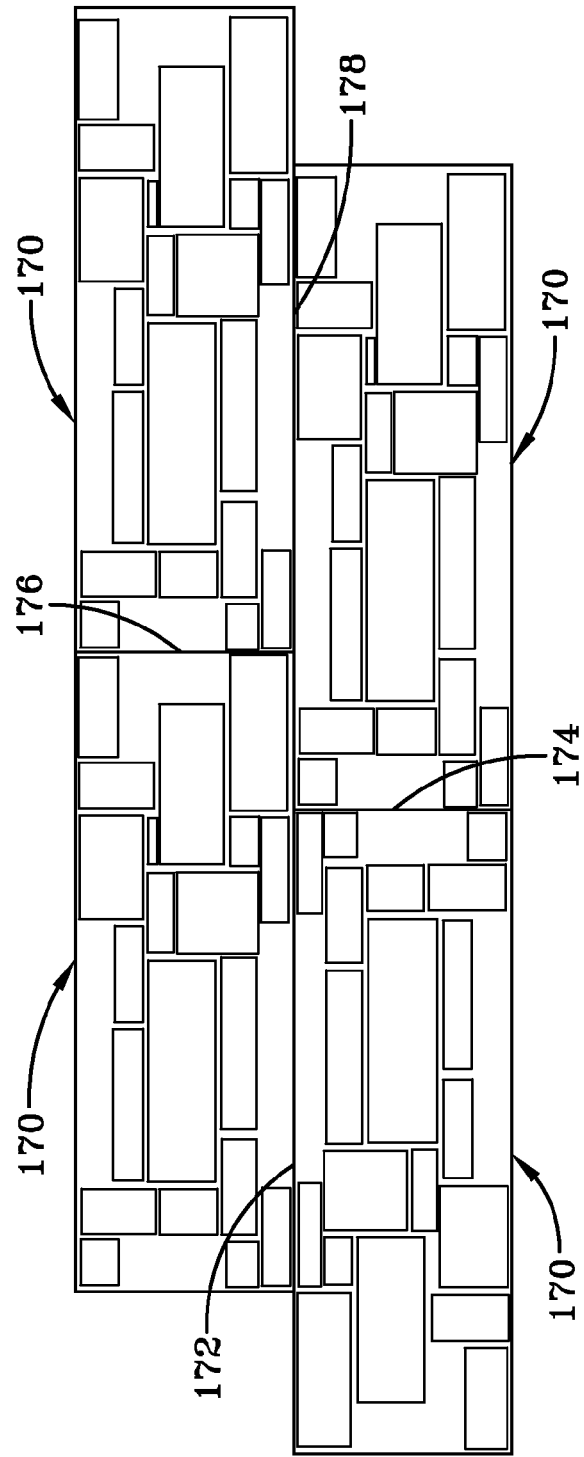
FIG. 19 is a front elevation view of an exemplary embodiment of a wall structure of the present invention that uses the panel of FIG. 18.

As another example, FIG. 18 shows a panel of the present invention. Again, at least one stone juts out relative to the other stone(s) along at least one edge of panel 170. However, such as shown in FIG. 18, panel 170 may still have at least one substantially straight edge even though the synthetic stones are not evenly aligned. In particular, FIG. 18 shows an example in which each edge of the panel is substantially straight even though the synthetic stones are uneven along the edges. As a result, this type of configuration enables the use of square panels, rectangular panels, and panels of other shapes having straight edges. FIG. 19 shows an exemplary installation of panels 170 stacked together. Such as shown in FIG. 19, it should be noted that panels 170 may be rotated relative to each other to make it more difficult to distinguish the joints between the panels. Furthermore, such as shown in FIG. 19, one row of panels 170 may be offset relative to another row of panels 170 to make it more difficult to distinguish the joints between the panels. Optionally, simulated filler stones may be used to obscure or hide joint 172, joint 174, joint 176, and joint 178 between adjacent panels 170. In other words, simulated filler stones may be used to fill in the gaps between the simulated stones after panels 170 have been connected together.

Figure 20:
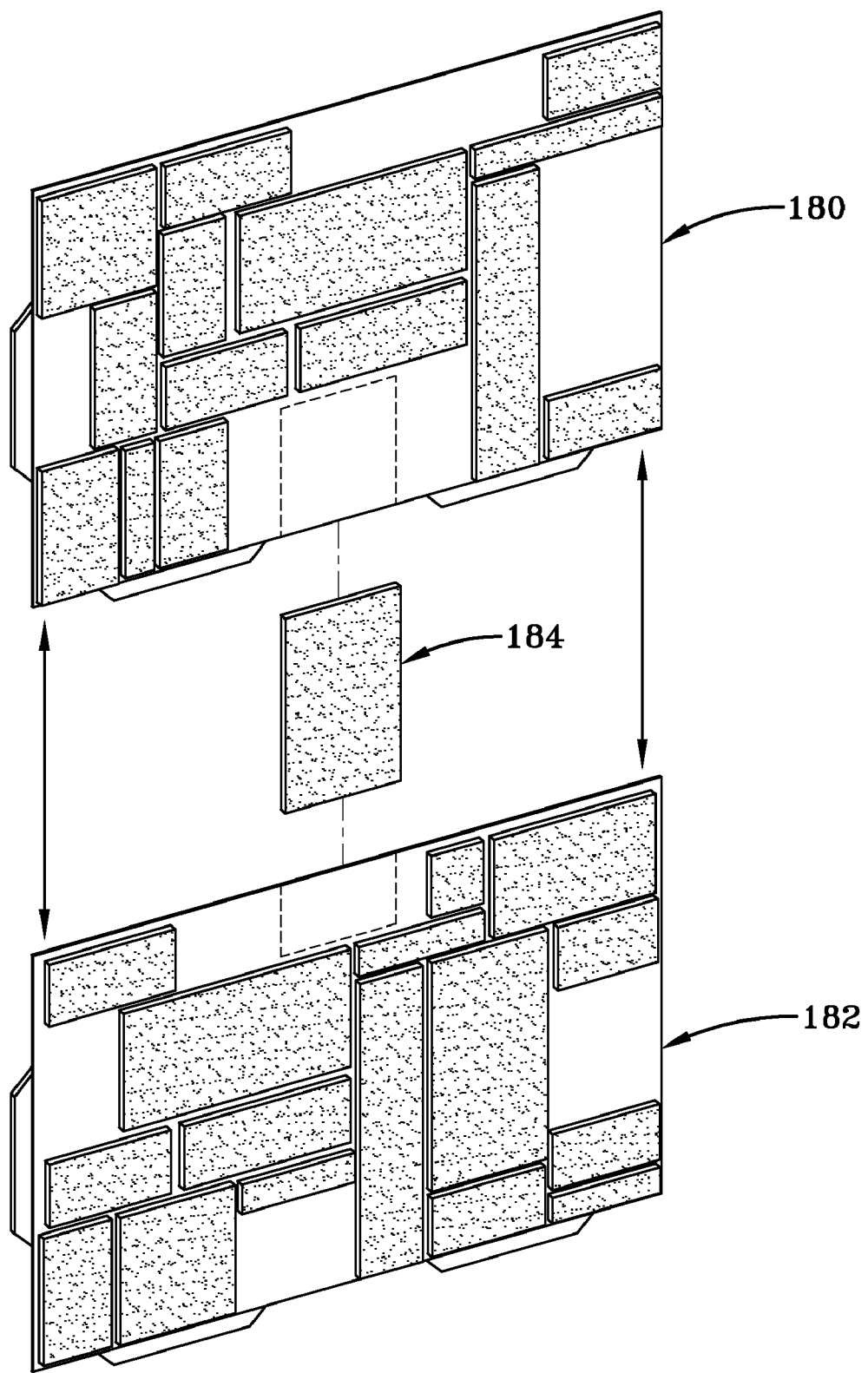
FIG. 20 is an exploded perspective view of another exemplary embodiment of a wall structure of the present invention.

FIG. 20 is another example of panels having at least one substantially straight edge even though the synthetic stones are not evenly aligned. In this example, after panel 180 and panel 182 have been connected together, at least one filler stone 184 may be used to fill in the gap between the stones of the adjacent panels. For example, such as shown in FIG. 20, filler stone 184 may cover the joint between panel 180 and panel 182, thereby obscuring the joint between the panels. A filler stone may be secured to the underlying panels using any suitable techniques and materials. For instance, examples of fasteners that may be used to secure a filler stone to an underlying panel include, but are not limited to, mechanical fasteners (e.g., screws, nails, pins, clamps, etc.), fabric fasteners (e.g., VELCRO and other hook and loop fastening materials), adhesives, glues, epoxies, polymers, tapes (e.g., pressure sensitive adhesive tapes), and other similar or suitable attachment materials.

Figure 25:
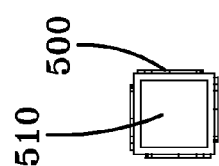
FIG. 25 is a top perspective view of an exemplary embodiment of a modular post utilizing the simulated stone of the present invention.
Figure 24:
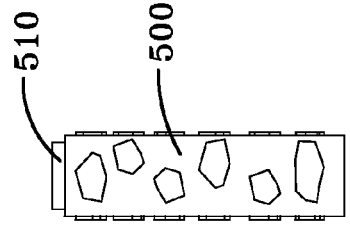
FIG. 24 is a front perspective view of an exemplary embodiment of a modular post utilizing the simulated stone of the present invention.

FIGS. 24 and 25 illustrate other exemplary embodiments of the simulated stone panels of the present invention. FIG. 24 is an example of a mailbox structure fitted with the simulated stone panels of the present invention. The simulated stone panels provide a durable exterior as well as having an esthetic appeal. FIG. 25 is an example of a column structure fitted with the simulated stone panels of the present invention. Both the mailbox in FIG. 24 and the column structure in FIG. 25 may be either freestanding or incorporated into a larger structure. The column structure in FIG. 25 may have a variety of uses including, but not limited too, fence posts or pillars. The molding process of the present invention allows a greater amount of flexibility in applications over natural stone, brick, or masonry. Although shown in a stone pattern FIGS. 24 and 25 the panels may be in stone, brick, masonry, or other suitable design.

Figure 21D:
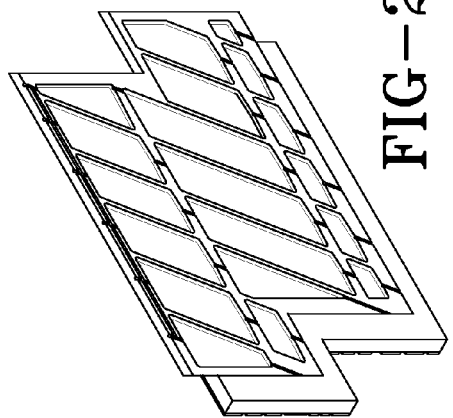
Figure 21E:
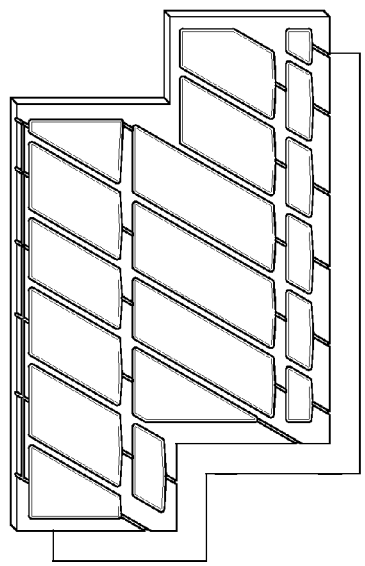
Figure 21A:
FIG. 21a is a side elevation view of an exemplary embodiment of a panel of the present invention.
Figure 21C:
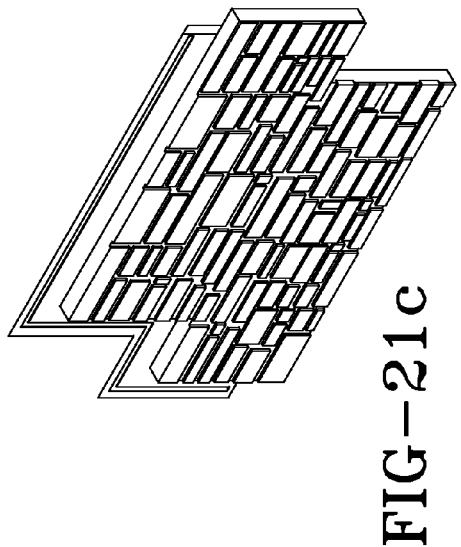
Figure 21B:
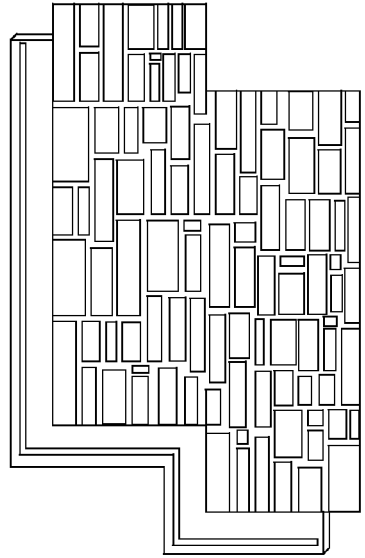

FIGS. 21a through 21e illustrate an exemplary embodiment of a panel comprising at least one of a recessed portion and at least one of an elevated portion to facilitate fluid flow over the panel's rear surface (e.g., a mold may impart the desired configuration). FIG. 21a illustrates a side elevation edge view of a molded panel. FIGS. 21b and 21c show front elevation and front perspective views of the panel, respectively. FIGS. 21d and 21e show rear perspective and rear elevation views of the panel, respectively.

Figure 22:
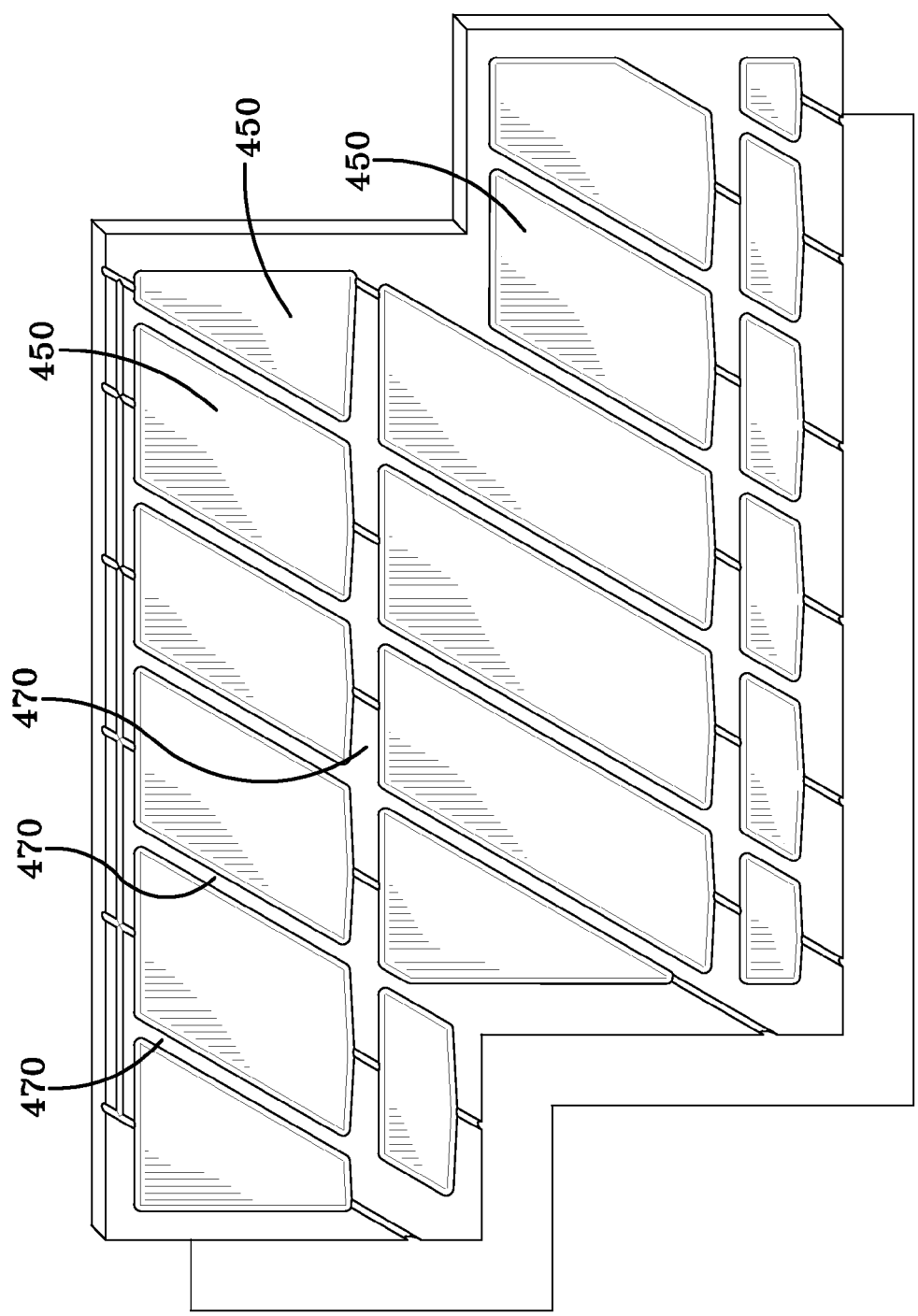

FIG. 22 shows a detailed view of the back surface of the panel, showing depressed portions 450 and elevated portions 470, wherein the depressed portions 450 are adapted to provide surface disparities with respect to the elevated portions 470, thereby forming channels or conduits that may allow the flow of fluids over the back surface of the panel, for example, to promote air ventilation and water drainage.

Exemplary panels may be manufactured using any suitable process for providing the desired result. For example, U.S.

Pat. No. 6,726,864 and U.S. Publication No. US 2005/0087908 describe simulated substrate texture processes that may be useful for manufacturing exemplary panels of the present invention. U.S. Pat. No. 6,726,864 and U.S. Publication No. US 2005/0087908 also describe materials that may be useful for simulating the appearance of certain building or construction products. Accordingly, the entirety of U.S. Pat. No. 6,726,864 and U.S. Publication No. US 2005/0087908 are also incorporated by reference.

For instance, in one exemplary method of manufacturing a panel, a mold may be used that is configured to form a panel that is adapted to simulate the appearance of stones or another desired building or construction material. In addition, materials may be selected that are adapted to simulate the colors and textures of stones or another building or construction material. An adhesive, the coloring and texturing materials, and a base resin charge may be then be provided in the mold such that the adhesive retains the coloring and texturing materials. Molding may then be performed at a temperature sufficient to accomplish melting fusion and thereby form the panel. One example of a molding process is rotational molding. Examples of other suitable molding processes for manufacturing exemplary panels include, but are not limited to, blow molding, vacuum molding, compression casting, compression molding, injection molding, and other similar or suitable molding techniques.

Examples of composite mixtures suitable for manufacturing some exemplary embodiments of panels (preferably via molding processes contemplated hereunder) may comprise some or all the following components:

| No. | Component | part by Weight |
|---|---|---|
| 1 | Polymer | 10-95 |
| 2 | Mineral Aggregate | 1-50 |
| 3 | Glue | 0.01-10 |
| 4 | Coloring | 0.01-10 |
| 5 | Optional Additives | 0.1-10 |

Mineral aggregates used may be selected from, but not limited to, sand, stone, limestone, concrete, iron ore, dirt, stone particles, ground stone, cement, organic materials, inorganic materials, and graded silica aggregates such as mica, quartz and feldspar, tires, dried solids, pigments, mineral oxides, color hardeners, conditioning admixtures comprised of a combination of at least some of the aforementioned materials, and other similar or suitable materials.

As will be appreciated by those skilled in the art, selection of a suitable molding powder or resin may facilitate a successful molding operation. Any suitable plastic may be used to manufacture an exemplary panel of the present invention. For example, it has been found that suitable UV-stabilized polyethylene raw material resins that are commercially available from several manufacturers, with a melt index in the range 2.0-6.5, may be particularly applicable to some exemplary embodiments of the present invention. Some resins having an acceptable combination of density per ASTM D-1505 and melt index per ASTM D-1238 (condition 2.16, 190) are illustrated in Table 1. It will be appreciated that these formulations—in conjunction with the manufacturing techniques taught hereunder—may be used to produce exemplary panels having superior mechanical properties, e.g., higher stiffness, excellent low temperature impact strength, and environmental stress crack resistance.

TABLE 1

Various Polyethylene Melt Index

| | 1 | 2 | 3 | 4 | 5 | 6 | 7 | 8 | 9 |
|---|---|---|---|---|---|---|---|---|---|
| Density | .941 | .938 | .938 | .941 | .935 | .936 | 0.948 | 0.945 | 0.945 |
| Melt Index | 2.0 | 2.6 | 3.5 | 4.0 | 5.9 | 6.5 | 6.5 | 2.0 | 6.5 |
| Flexural Modulus | 130,000 | 95,000 | 102,000 | 120,000 | 87,000 | 80,700 | 160,000 | 150,000 | 135,000 |

| No. | Component | % by Volume |
|---|---|---|
| 1 | Tires | 5-40 |
| 2 | Dried Solids | 3-3.5 |
| 3 | Polymer | 60-80 |
| 4 | Glue | 3-10 |
| 5 | Sand | 10-22 |
| 6 | Cement | 5-11 |
| 7 | Coloring | 5-12 |
| 8 | Color Hardener | 4-14 |

Another example of composite mixtures suitable for manufacturing some exemplary embodiments including, but not limited to, cladding, siding, panels, garden pots, pottery, containers, columns, and mailboxes, may comprise some or all of the following components:

Polyethylene raw materials contemplated by some exemplary embodiments of the present invention may be readily obtained from suppliers worldwide. Suppliers in the United States include Southern Polymer, Inc. of Atlanta, Ga.; ExxonMobil Chemicals of Edison, N.J.; CP Chem of Bartlesville, Okla.: Nova Chemicals of Alberta; Equistar-Lyondell-Basell Inc. of Cincinnati, Ohio; H. Muehlstein & Company, Inc. of Houston, Tex.; Chroma Corporation of McHenry, Ill.; A. Schulman, Inc. of Akron, Ohio; and Formosa Plastics. For instance, an exemplary Southern Polymer LLDPE resin corresponding to properties shown in column 4 of Table 1, includes a tensile strength of 2,700 psi per ASTM D-638 (2" per minute, Type IV specimen, @0.125" thickness), heat distortion temperature of 53° C.@66 psi and 40° C.@264 psi per ASTM D-648, low temperature impact of 50 ft. lbs. for a ⅛" specimen and 190 ft. lbs. for a ¼" specimen per ARM Low Impact Resistance.

As another example, Lyondell-Basell Petrochemicals sells LLDPE resin GA-635-662 corresponding to properties shown in column 6 of Table 1, which includes a tensile strength of 2,500 psi per ASTM D-638, heat distortion temperature of 50° C.@66 psi and 35° C.@264 psi per ASTM D-648, low temperature impact of 45 ft. lbs. for a ⅛" specimen and 200 ft. lbs. for a ¼" specimen per ARM Low Impact Resistance, and ESCR Condition A, F50 of greater than 1,000 hrs. per ASTM D-1693@100% Igepal and 92 hrs.@10% Igepal. Similarly, ExxonMobil Chemicals sells MRA-015 corresponding to properties shown in column 5 of Table 1, which includes a tensile strength of 2,650 psi, heat distortion temperature of 56° C.@66 psi and 39° C.@264 psi, low temperature impact of 58 ft. lbs. for a ⅛" specimen and 180 ft. lbs. for a ¼" specimen, and ESCR Condition A, F50 of more than 1,000 hrs.@100% Igepal. Similarly, Nova Chemicals sells TR-0338-U/UG corresponding to properties shown in column 3 of Table 1, which includes a tensile strength of 3,000 psi, heat distortion temperature of 50° C.@66 psi, low temperature impact of 60 ft. lbs. for a ⅛" specimen, and ESCR Condition A, F50 of more than 1,000 hrs.@100% Igepal.

As yet another example is Formosa Plastics' Formolene L63935U having Melt Index of 3.5 and density of 0.939, along with flexural modulus of 110,000 psi, a tensile strength of 3,300 psi at yield, heat defection temperature of 54° C.@66 psi, low temperature impact of 60 ft. lbs. for a ⅛" specimen, and ESCR Condition A, F50 of greater than 1,000 hrs.@100% Igepal and 60 hrs.@10% Igepal.

Another component of the combinations of materials taught by an exemplary embodiment of the present invention may be an adhesive adapted to accomplish the purposes herein described in detail. For example, XP-10-79 C pressure sensitive adhesive of Chemical Technology Inc. (Detroit, Mich.) is a water base adhesive with a styrene butadiene adhesive base designed to bond various foam substrates, such as polyethylene and polystyrene. Representative properties include a viscosity of 5000-7000 cps Brookfield RVT Spindle #3@77° F.; pH of 7.5-9.5; weight per gallon of 8.3 lb; no flash point; color blue; 50-54% solids; 20 minutes dry time; no freeze/thaw cycle (may be frozen). Another example of a suitable adhesive is a Henkel Adhesives (Lewisville, Tex.) polyvinyl resin emulsion 52-3069 having a viscosity of 3750 cps Brookfield RVT@76° F.; pH 4.5; weight per gallon of 9.0 lb; 55% solids; 212 boiling point ° F.; specific gravity of 1.1; vapor pressure the same as water@20° C.; solubility in water is dispersible when wet; white fluid appearance; polyvinyl odor; no flash point. Another is Forbo PA245-2N. Nevertheless, it should be recognized that any other suitable adhesive or combination of adhesives may be used for an exemplary structure or method of the present invention, including but not limited to: natural rubber; styrene-butadiene rubber; cellulose-based glues; acrylic-based glues; polyolefin emulsions; polyolefin suspensions; and polyurethane adhesives.

It will be appreciated that another component of an exemplary embodiment of the present invention is pigment colors and texturing materials that may, for example, be selected from a broad group of organic materials, inorganic materials, mineral oxides, cement, graded silica aggregates, and special conditioning admixtures. For example, one suitable pigment color component is Bomanite Color Hardener, among others, which is a dry shake material designed for coloring and hardening concrete flatwork. It is comprised of a blend of mineral oxide pigments, cement, and graded silica aggregates. It has also been found that special conditioning admixtures may be included in exemplary formulations to improve workability.

Bomanite Color Hardener has been found to be useful either in its regular grade or in its heavy duty grade. As will be appreciated by those skilled in the art, the regular grade is commonly intended for applications such as residential driveways, patios, pool decks, entryways, walkways, showroom floors, lobbies, and medians. On the other hand, the heavy duty grade, formulated with specially graded Emery, i.e., aluminum oxide for increasing wear resistance, is commonly intended for heavy-traffic applications such as vehicular entrances, theme parks, plazas, crosswalks, street sections, and highly-trafficked sidewalks. As will be understood by those conversant in the art, color hardeners such as Bomanite Color Hardener may afford a variety and intensity of colors such that many hues—ranging from soft pastels to vivid blues and purples—may be obtained with improved imprinting, increased durability, and increased resistance to wearing and fading.

As will be readily appreciated by those skilled in the art, another component material taught by an exemplary embodiment of the present invention is foam, which may include, but is not limited to, conventional ½ pound density packing urethane foam and other similar or suitable foams. For such exemplary structures and panels as simulated stone and masonry and brick wall panels, this urethane foam may impart not only excellent sound absorption qualities, but also structural stability. It should be evident to those skilled in the art that exemplary simulated stone, masonry, and brick texture wall panels such as contemplated by the present invention may accurately replicate the look-and-feel of stone, masonry, and brick, respectively, and simultaneously may also replicate some of the physical properties of stone, masonry, and brick.

It is an advantage and feature of one exemplary embodiment of the present invention that panels (e.g., siding panels, wall panels, fence panels, barrier panels, etc.) may be produced from the materials hereinbefore described according to the exemplary molding techniques of the present invention such that the panels are not only surprisingly lightweight, but also are readily stacked and layered together. This novel stacked and layered structure may enable simulated panels or the like to be used as panels for homes, buildings, walls, fences, or the like. It is also an advantage and feature of an exemplary embodiment of the present invention that structures and panels produced as herein elucidated may be surprisingly lightweight and may be manufactured in a wide range of colors.

It will be appreciated that exemplary embodiments of the present invention may be constructed from not only polyethylene materials, but also from a plethora of other commercially available suitable plastic materials which may include either virgin or recycled plastics or some admixture of both. It should also be clear that an advantage of an exemplary embodiment of the present invention may be its unique ability to inherently obtain an integrated finish, and, preferably, to obtain a totally integrated finish. Furthermore, it has been discovered that the efficacy of some exemplary embodiments of the present invention may be attributable to using synergistic formulations of special adhesives and to preparing suitable molds for receiving other synergistic combinations of virgin and recycled materials such as described herein.

It has further been discovered that, indeed, a broad range of plastics may be accommodated by the exemplary teachings herein. For instance, such components as rubber, tire rubber, and even chrome rubber may be advantageously used in some exemplary embodiments as described herein. As another example of the breadth of the applicability of exemplary embodiments of the present invention, the base resin may be thermoplastics or thermosets selected from, but not limited to, linear low density polyethylene (LLDPE), very low density polyethylene, low density polyethylene (LDPE), medium density polyethylene (MDPE), high density polyethylene (HDPE), polypropylene (PP), nylon, polyvinyl chloride (PVC) powder, polyvinyl chloride (PVC) plastisol, acrylic, acrylonitrile-butadiene-styrene (ABS), acrylonitrile-styreneacrylate (ASA), polycarbonate, polystyrene (PS), high impact polystyrene (HIPS), sheet molding compound (SMC), bulk molding compound (BMC), polyurethane foam, polyurethane solid, polyester, ethylene homopolymers, ethylene copolymers, propylene homopolymers, propylene copolymers, vinyl chloride polymers, vinyl chloride-acrylate polymers, polyamide, polyalkenes, ethylene-ester copolymers, urea-formaldehyde, unsaturated polyester, melamine-formaldehyde, unsaturated polyamide, cross-linked thermoplastics, cross-linked elastomers, styrene-butadiene rubber and other similar or suitable plastics. These resins may be used singularly or optionally as some admixture of such. Among these polyethylene and polypropylene are preferred.

Fillers of the base resin may be used and may be selected from, but not limited to, corn cobs, rice hulls, newspaper, fly ash, bagasse, coconut shells, flax, wood, kenaf, peanut shells, cotton bolls, bamboo, glass fiber, glass bead, calcium carbonate, talc, kaolin, clay, and other similar or suitable natural or inorganic fillers. High Aspect fillers may also be used and include, but are not limited to, wood fiber, wood flour, bagasse, grain husks, cotton, cotton husk fiber, bamboo fiber, plastic fibers, mats, non-woven plastics, polymer fabrics, new and recycled nylon fibers, mica, talc, limestone, calcium carbonate, gypsum, silica, wollastonite, ceramic and glass fibers; mats and rods, and thermoset particulates such as SMC or BMC or prime or recycled rubber. These high aspect fillers may be included with or without chemical bonding to the matrix polymer.

Additionally, the base resin may optionally include flame retardants and smoke suppressants of the types selected from, but not limited to, intumescent types, halogenated types, non-halogenated types, phosphate types, borate types, magnesium types, antimony oxide, aluminum trihydrate (ATH), and other similar or suitable materials. Furthermore, the base resin may include ultraviolet light stabilizers of the types selected from, but not limited to, benzophenones, benzotriazoles, hindered amine light stabilizers (HALS), organic nickel compounds, pigments suitable for screening ultraviolet energy (e.g., titanium dioxide), and other similar or suitable materials such as free-radical scavengers. The base resin may also include antioxidants, stabilizers, nucleating agents, cross-linking agents, coupling agents, compatibilizers, additives to improve scratch resistance, flow aids, process aids, and surface modifying additives.

Depending on the surface chemistry, additional coupling agents and compatibilizers may be optionally used to provide chemical bonding and enhanced stress transfer which results in synergistic improvements in many properties. Examples of such compatibilizers include, but are not limited to, polyolefins grafted with functional groups such as maleic anhydride, acrylic acid, glycidyl esters to provide functional groups such as unsaturated C=C, or carboxylic acid or carboxylic acid anhydride, or epoxy groups. These composite materials may be converted to specific parts such as panels, cladding, siding, or other articles suitable for the building and construction industry by plastic processing methods commonly known to one skilled in the art.

Although rotational molding is one preferred molding method, as will be appreciated by those skilled in the art, manufacturing procedures of some other exemplary embodiments of the present invention may incorporate processes including, but not limited to, compression molding, compression casting, injection molding, vacuum thermoforming, vacuum molding, pressure thermoforming, extrusion blow molding, casting, spray-up techniques, and other similar or suitable techniques. For example, compression molding may be advantageously used using a sheet or pre-weighed charge of resin for producing a non-hollow part. Similarly, thermoforming (vacuum or pressure forming) may be used to form a single sheet into a non-hollow part or to form a twin-sheet to produce a two-sided hollow part. Extrusion blow molding may be advantageously used to form two-sided hollow parts, which may be subsequently and effectively split into a plurality of parts, thereby economically producing an increased number of product pieces during a fabrication cycle. Casting with an oven cure cycle or spray-up techniques are further examples of methods that may be used to produce a non-hollow part. If foaming is desired, blowing agents in an exemplary molding process may include, but are not limited to, endothermic and exothermic agents useful for foaming the inner surface of the panel during the molding process. It has been discovered that vacuforming techniques may also be invoked to produce exemplary panel embodiments contemplated hereunder. For example, in some of these approaches, the specially formulated materials taught herein may be injected or drawn into a prepared mold, instead of or as a supplement to being loaded into a pre-charged mold. The exemplary simulated stone, masonry, and brick textured panel embodiments that are thus produced may provide the unique characteristics and properties herein elucidated in detail. These examples are not intended to limit the present invention and are offered to teach those skilled in the art the wide variety of manufacturing methods by which to form desired parts.

Figure 23:
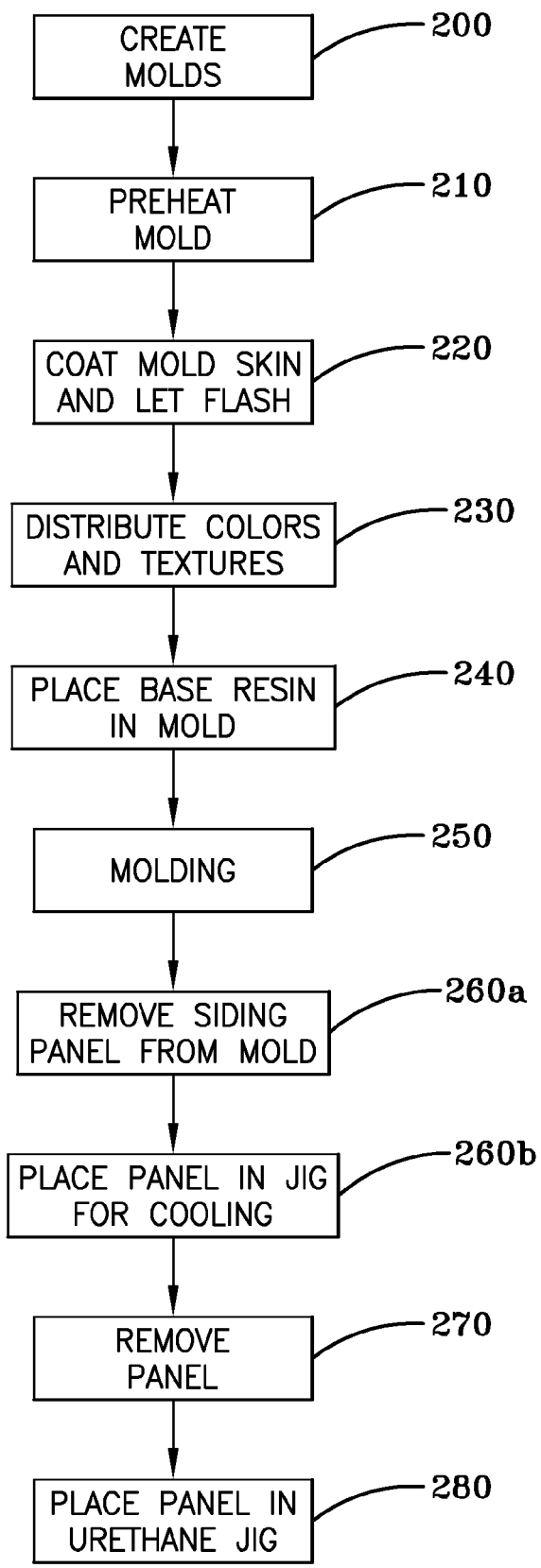
FIG. 23 is a block diagram of another exemplary embodiment of a step-wise molding process that may be used for manufacturing simulated stone and/or masonry and/or brick textured panels or other structures wherein the cooling step is performed externally to the mold.
Figure 33:
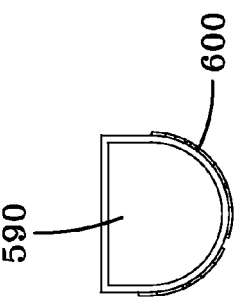
FIG. 33 is a top perspective view of an exemplary embodiment of a modular half round column utilizing the simulated stone of the present invention.
Figure 32:
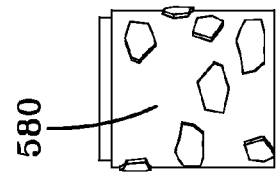
FIG. 32 is a front perspective view of an exemplary embodiment of a modular half round column utilizing the simulated stone of the present invention.
Figure 31:
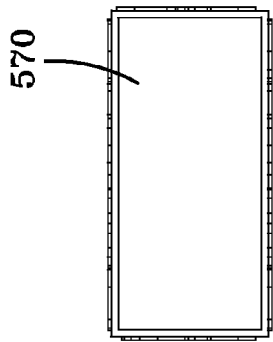
FIG. 31 is a top perspective view of an exemplary embodiment of a modular rectangular base utilizing the simulated stone of the present invention.
Figure 30:
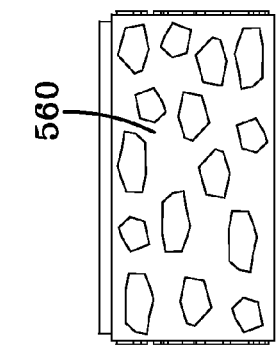
FIG. 30 is a front perspective view of an exemplary embodiment of a modular rectangular base utilizing the simulated stone of the present invention.
Figure 29:
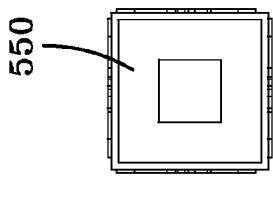
FIG. 29 is a top perspective view of an exemplary embodiment of a modular half column utilizing the simulated stone of the present invention.
Figure 28:
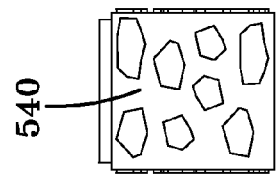
FIG. 28 is a front perspective view of an exemplary embodiment of a modular half column utilizing the simulated stone of the present invention.
Figure 27:
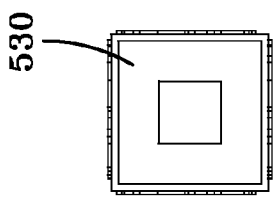
FIG. 27 is a top perspective view of an exemplary embodiment of a modular column utilizing the simulated stone of the present invention.
Figure 26:
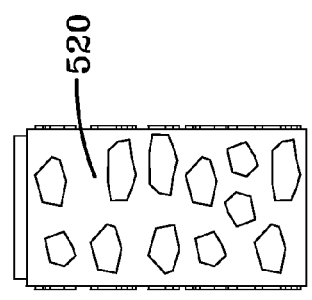
FIG. 26 is a front perspective view of an exemplary embodiment of a modular column utilizing the simulated stone of the present invention.

Another exemplary embodiment of the present invention depicting a method of manufacturing aforementioned exemplary panels, wherein the cooling of the panel is performed separately and externally to the mold such that step 260 shown in FIG. 1 is replaced by steps 260a and 260b as illustrated in FIG. 23. Specifically, a molded panel is removed from the mold in an elevated temperature condition, placed in a cooling jig disparate from the mold, and then cooled. Cooling of the panel may be effected by means described hereinbefore. In an exemplary embodiment, the cooled panel may thereafter be removed from the cooling jig and placed within a urethane jig permitting a foam backer to be optionally applied to the panel as illustrated in FIG. 23 as steps 270 and 280 respectively.

In one exemplary example, a panel was prepared as follows: A mold was decorated using the method described earlier with glue and color aggregates, more glue and 1 lb. of background shake, and then charged with 6 lb. of Equistar resin 635-662 and a zip-lock bag of 4.5 lb. of foamed polyethylene from McCann Corp. Instead of traditional rotomolding, the mold was inserted into the oven with the oven temperature at 475° F. It was left there for 24 min without any biaxial or uniaxial rotation and then water-cooled with a fine water mist and air cooled and the part demolded. When cut open, the panel showed excellent foam coverage inside of the solid polyethylene skin with excellent aesthetics on the front of the panel. The panel demonstrated the use of the "Shake and Bake" method using a two-step polyethylene foam.

Because the composition of the stimulated stone material is lightweight and durable, the simulated stone material may be used in a plethora of applications besides panels. One such application is the construction of modular core components 500, 520, 540, 560, and 580. FIGS. 24-33 illustrate various embodiments of modular core components 500, 520, 540, 560, and 580 comprising the simulated stone material of the present invention. Exemplary embodiments of the modular components include a post 500, column 520, half column 540, rectangular base 560, and a half round column 580. The simulated stone material of the present invention used on the visible on the exterior of the modular components 500, 520,

540, 560, and 580 may simulate conventional building or construction materials including, but not limited to, stone, brick, masonry, stucco, concrete, wood, other conventional building and construction materials, and combinations thereof. The durability of the simulated stone material of the present invention may also allow for stacking of the modular components 500, 520, 540, 560, and 580. Each modular core component 500, 520, 540, 560, and 580 may have means of attachment 510, 530, 550, 570, and 590 on a top portion. The means for attachments 510, 530, 550, 570, and 590 may include wood, metal, or other material providing a suitable surface for attachment to the modular core components 500, 520, 540, 560, and 580.

FIGS. 34-38 illustrate exemplary embodiments of storage units comprising columns 520 of the present invention. FIG. 34 is an exemplary embodiment of a top loading storage unit. FIGS. 35, 37, and 38 are examples of side loading storage units. FIG. 36 is an exemplary embodiment of a column 520 adapted to comprise a hose reel base.

FIG. 39 illustrates an exemplary embodiment of columns 520 in a stacked configuration.

Figures 40, 41, 42:
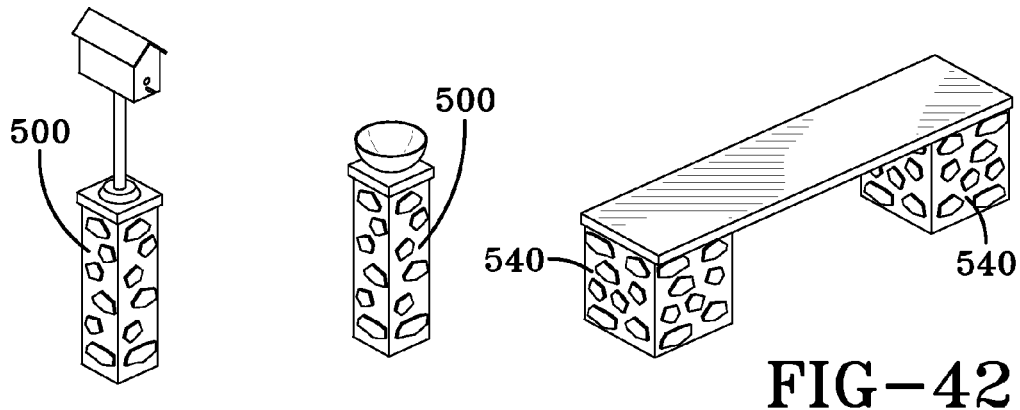
FIG. 40 is a perspective view of an exemplary embodiment of a bird house stand comprising a modular post of the present invention.
FIG. 41 is a perspective view of an exemplary embodiment of a bird bath stand comprising a modular post of the present invention.
FIG. 42 is a perspective view of an exemplary embodiment of a bench comprising multiple modular half column of the present invention.

FIGS. 40 and 41 illustrate an exemplary embodiment of stands comprising posts 500 of the present invention.

FIG. 42 illustrates an exemplary embodiment of a bench comprising half columns 540 of the present invention. The bench seating area may be fixed to the half columns 540 by the means for attachment 550 (shown in FIG. 29).

Figures 43, 44, 45:
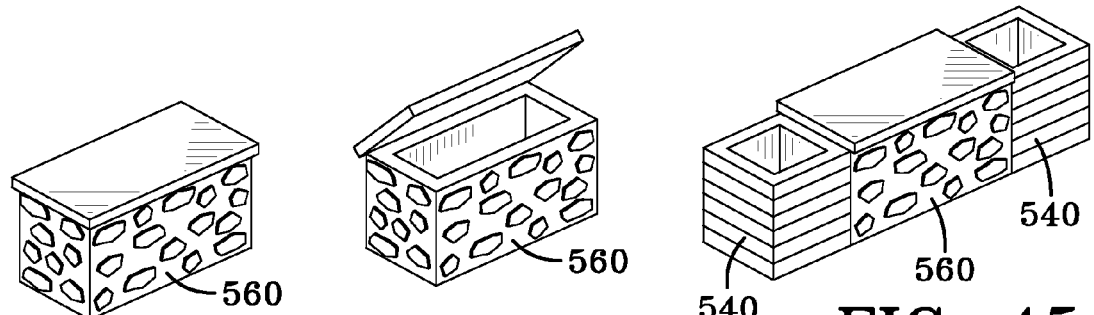
FIG. 43 is a perspective view of an exemplary embodiment of a bench comprising a modular rectangular base of the present invention.
FIG. 44 is a perspective view of an exemplary embodiment of a bench having storage space comprising a modular rectangular base of the present invention.
FIG. 45 is a perspective view of an exemplary embodiment of a sectional comprising both modular half columns and a rectangular base of the present invention.

FIG. 43 illustrates an exemplary embodiment of a bench comprising a rectangular base 560 of the present invention.

FIG. 44 illustrates an exemplary embodiment of a bench having a storage area comprising a rectangular base 560 of the present invention. To provide storage the rectangular base 560 is constructed having a hollow interior.

FIG. 45 illustrates an exemplary embodiment of a sectional comprising a rectangular base 560 and two columns 560. The modular core components 500, 520, 540, 560, and 580 may be adapted to fit together in a side-by-side configuration. Additionally, the modular core components 500, 520, 540, 560, and 580 may be adapted to lock together to increase stability.

Figures 46, 47:
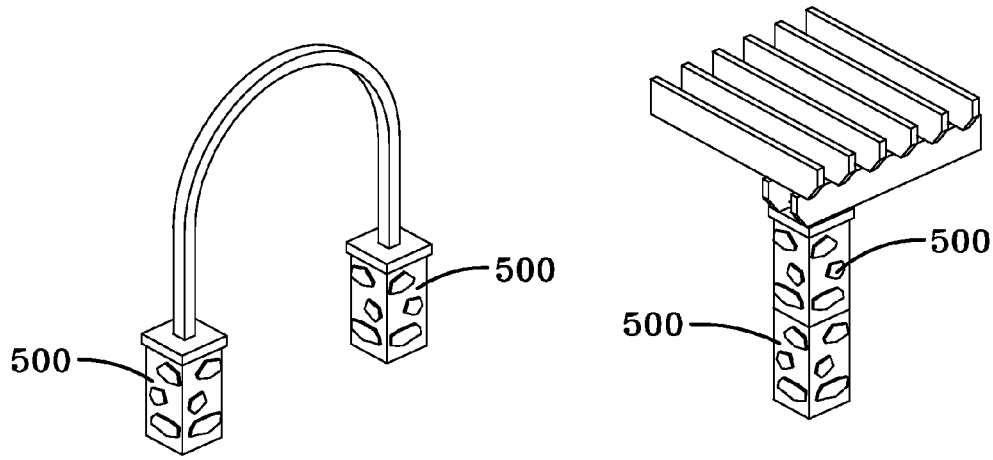
FIG. 46 is a perspective view of an exemplary embodiment of an arbor comprising multiple modular posts of the present invention.
FIG. 47 is a perspective view of an exemplary embodiment of a pergola comprising stacked modular posts of the present invention.

FIG. 46 illustrates an exemplary embodiment of an arbor supported by posts 500.

FIG. 47 illustrates an exemplary embodiment of a pergola supported by pillars comprising stacked posts 500. The posts 500 may be fixed to one another to increase stability.

Figure 48:
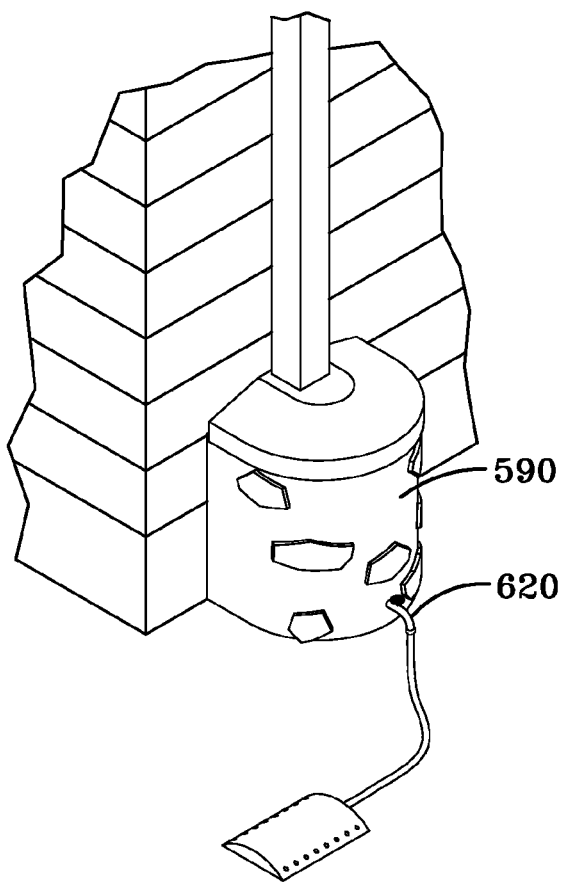
FIG. 48 is a perspective view of an exemplary embodiment of a downspout water collection vessel comprising a modular half round column of the present invention.

FIG. 48 illustrates an exemplary embodiment of a downspout water collection vessel comprising a half round column 580. The half round column 580 may be molded with a curved side 600 (shown in FIG. 32). The half round column 580 may have a water valve 620 attached to allow drainage of downspout water.

Figure 49:
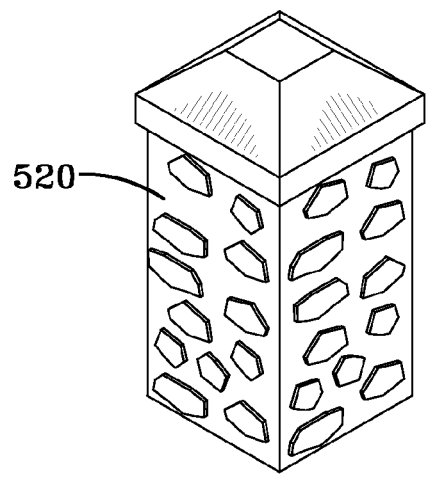
FIG. 49 is a perspective view of an exemplary embodiment of a garbage container comprising a modular column of the present invention.
Figure 50:
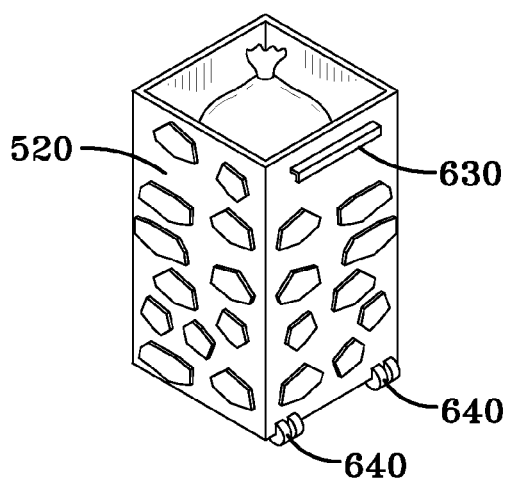
FIG. 50 is a perspective view of an exemplary embodiment of a mobile garbage container comprising a modular column of the present invention.
Figure 51:
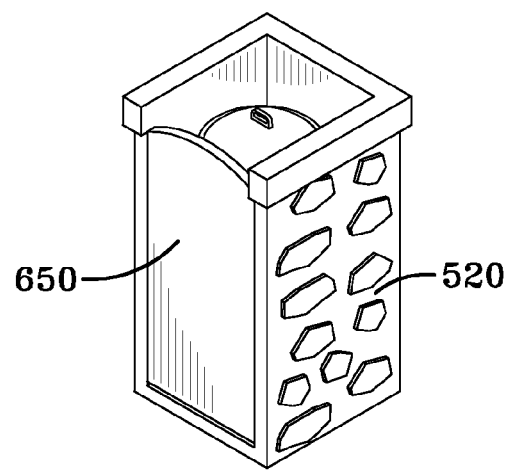
FIG. 51 is a perspective view of an exemplary embodiment of a gated storage unit comprising a modular column of the present invention.

FIGS. 49, 50, and 51 are exemplary embodiments of garbage concealment units comprising columns 520. FIG. 50 is a portable garbage container wherein the column 520 may be adapted to include a handle 630 and wheels 640. FIG. 51 is a garbage concealment unit wherein the column 520 is adapted to include a gate 650.

Figure 52:
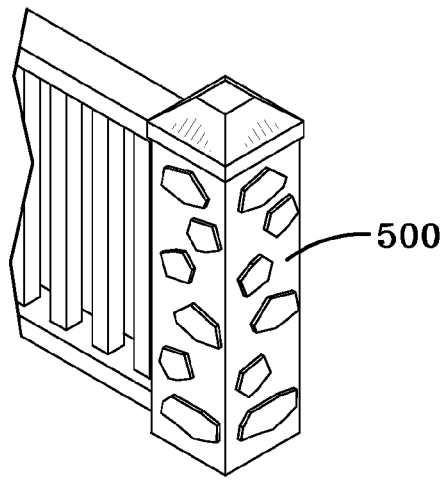
FIG. 52 is a perspective view of an exemplary embodiment of a deck post comprising a modular post of the present invention.
Figure 53:
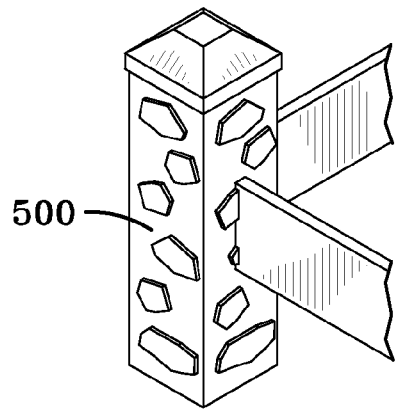
FIG. 53 is a perspective view of an exemplary embodiment of an integrated notched post comprising a modular post of the present invention.
Figure 54:
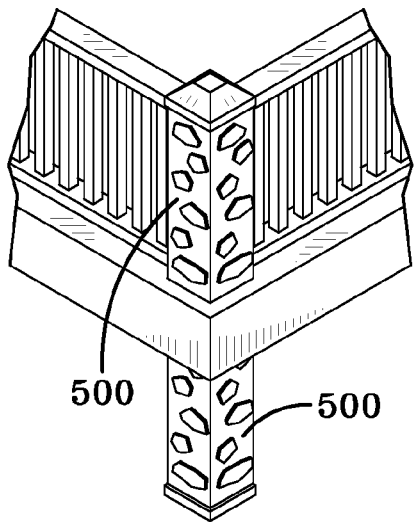
FIG. 54 is a perspective view of an exemplary embodiment of an integrated deck post comprising a modular post of the present invention.

FIGS. 52, 53, and 54 illustrate posts 500 integrated into a deck structure. The strength of the modular core components 500, 520, 540, 560, and 580 is sufficient to support a deck structure. Post 500 may be adapted to connect with the components of a deck structure.

Figure 55:
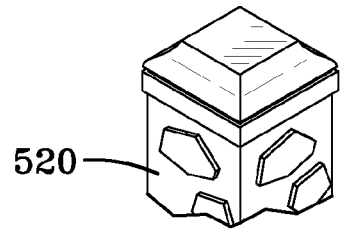
FIG. 55 is a perspective view of an exemplary embodiment of modular column of the present invention having a decorative cap.
Figure 56:
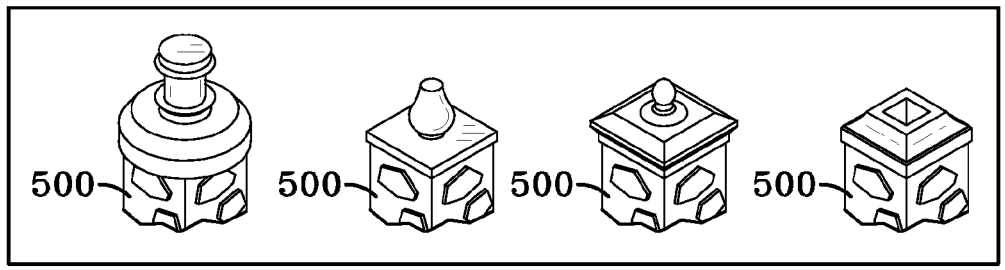
FIG. 56 is an illustration of various decorative caps that may be used with modular posts of the present invention.

FIGS. 55 and 56 illustrate a column 520 and posts 500 having decorative caps. The decorative caps may be fixed the means of attachments 510 and 530.

Figure 57:
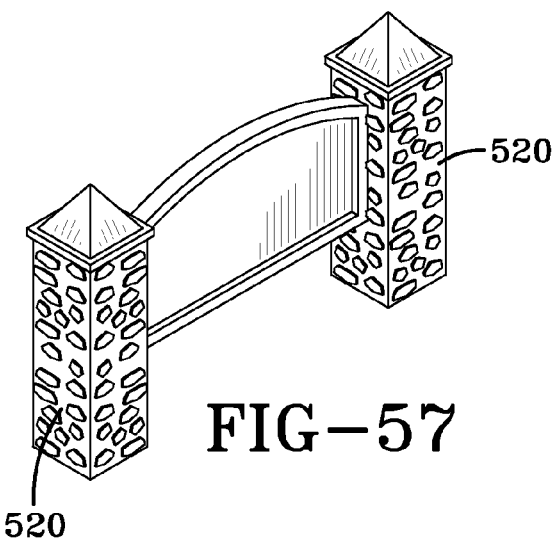
FIG. 57 is a perspective view of an exemplary embodiment of signage comprising multiple modular columns of the present invention.

FIG. 57 is an exemplary embodiment of signage comprising columns 520 of the present invention. The columns 520 may be adapted to support a sign.

Figure 58:
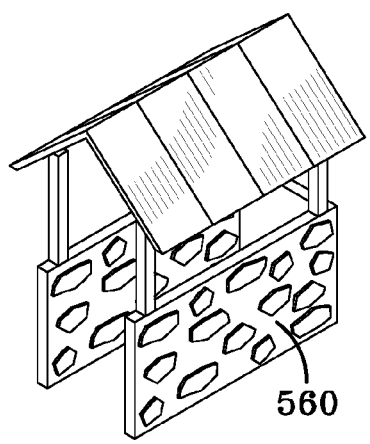
FIG. 58 is a perspective view of an exemplary embodiment of a corral comprising a modular rectangular base of the present invention.

FIG. 58 is an exemplary embodiment of a corral comprising a rectangular base 560. The rectangular base 560 is adapted to include an opening.

Figure 59:
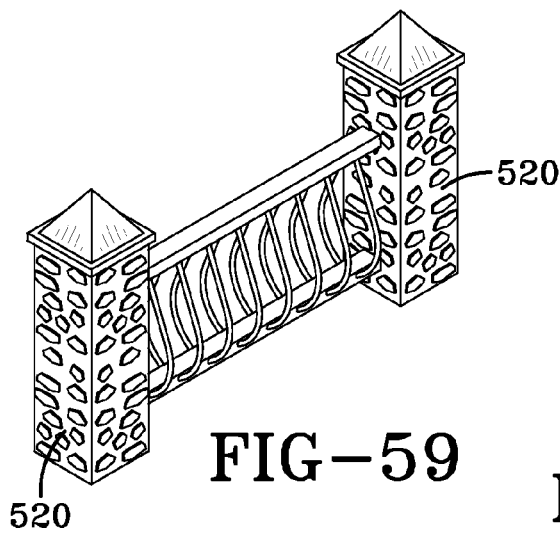
FIG. 59 is a perspective view of an exemplary embodiment of a bicycle rack comprising multiple modular columns of the present invention.

FIG. 59 is an exemplary embodiment of a bicycle rack comprising columns 520. The columns 520 may be adapted to support the frame of the bicycle rack.

Figure 60:
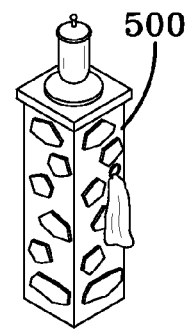
FIG. 60 is a perspective view of an exemplary embodiment of a golf ball washing stand comprising a modular post of the present invention.
Figure 61:
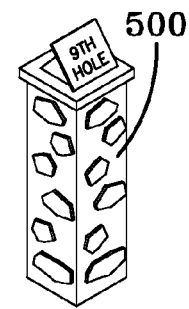
FIG. 61 is a perspective view of an exemplary embodiment of a golf course marking stand comprising a modular post of the present invention.

FIGS. 60 and 61 are exemplary embodiments of posts 500 adapted for use as stands for various golf course uses.

Figure 62:
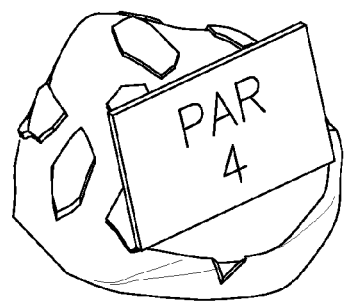
FIG. 62 is a perspective view of an exemplary embodiment of a golf course marker comprising the simulated stone material of the present invention.
Figure 63:
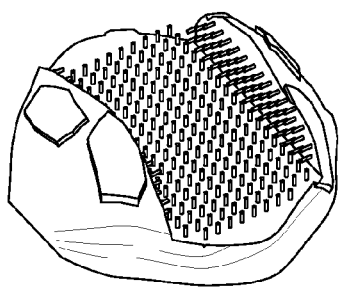
FIG. 63 is a perspective view of an exemplary embodiment of a shoe brush comprising the simulated stone material of the present invention.

FIG. 62 is a mound of the simulated stone material of the present invention adapted to hold a sign. FIG. 63 is a mound of the simulated stone material of the present invention adapted to include a shoe brush for use on a golf course.

Figure 64:
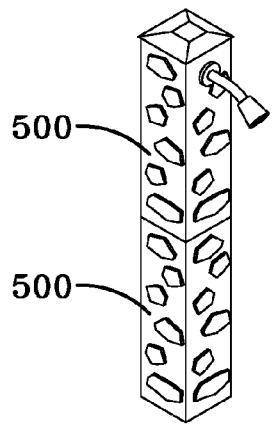
FIG. 64 is a perspective view of an exemplary embodiment of a shower comprising multiple modular posts of the present invention.
Figure 65:
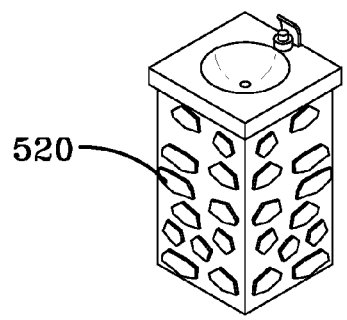
FIG. 65 is a perspective view of an exemplary embodiment of a water fountain comprising a modular half column of the present invention.

FIG. 64 is an exemplary embodiment of a shower comprising posts 500. The posts 500 are in a stacked configuration and are adapted to house plumbing for the shower device. FIG. 65 is an exemplary embodiment of a water fountain comprising a half column 540. The half column 540 is adapted to house the plumbing for the water fountain device.

Figure 66:
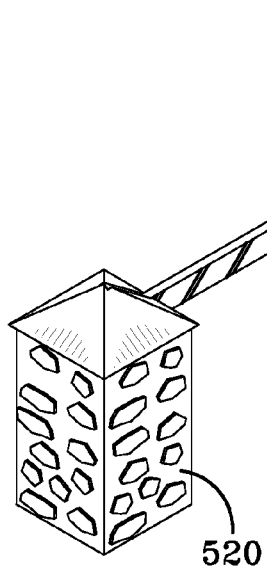
FIG. 66 is a perspective view of an exemplary embodiment of a barricade comprising modular columns of the present invention.

FIG. 66 is an exemplary embodiment of a barricade comprising columns 520. The columns 520 may be adapted to support the barricade structure.

Figure 67:
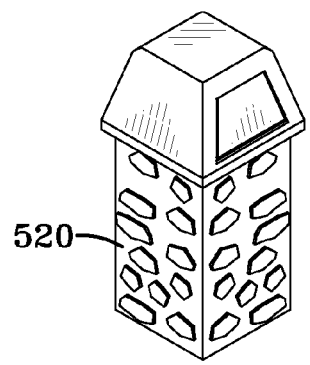
FIG. 67 is a perspective view of an exemplary embodiment of a waste bin comprising a modular column of the present invention.
Figure 68:
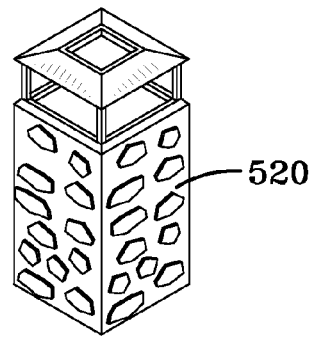
FIG. 68 is a perspective view of an exemplary embodiment of a waste bin comprising a modular column of the present invention.

FIGS. 67 and 68 are exemplary embodiments of garbage receptacles comprising columns 520 of the present invention.

Figure 69:
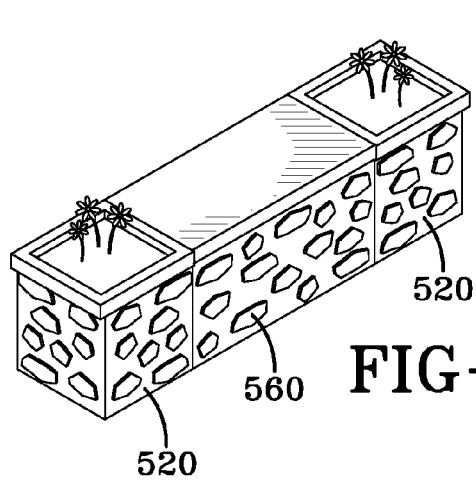
FIG. 69 is a perspective view of an exemplary embodiment of a sectional comprising both modular columns and a rectangular base of the present invention.

FIG. 69 is an exemplary embodiment of a sectional comprising a rectangular base 560 and columns 520. The rectangular base 560 and columns 520 are shown on a side-by-side configuration.

Figure 70:
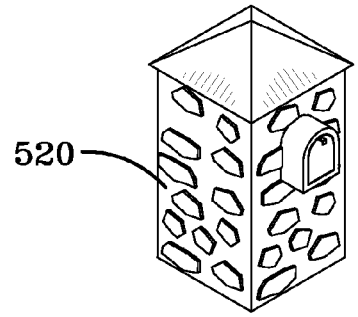
FIG. 70 is a perspective view of an exemplary embodiment of a mailbox comprising a modular column of the present invention.

FIG. 70 is an exemplary embodiment of a mailbox comprising a column 520. The column 520 may be adapted to house a mailbox.

Figure 71:
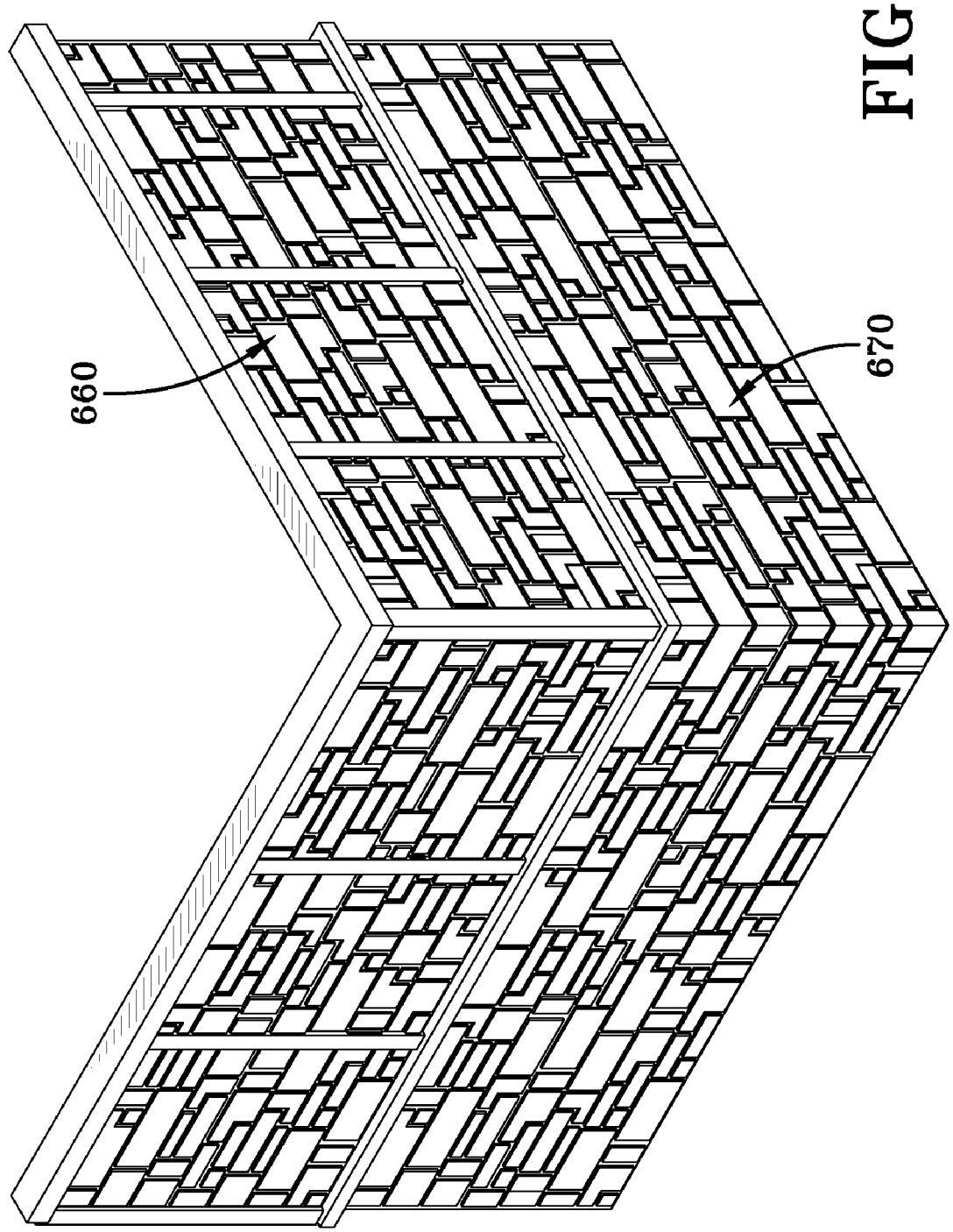
FIG. 71 is a perspective view of an exemplary embodiment of fencing and retaining wall cladding constructed from a composition of the present invention.

FIG. 71 is an exemplary embodiment of fencing 660 and retaining wall cladding 670. The retaining wall cladding 670 may be used to clad both marine and inland retaining walls.

Figure 72:
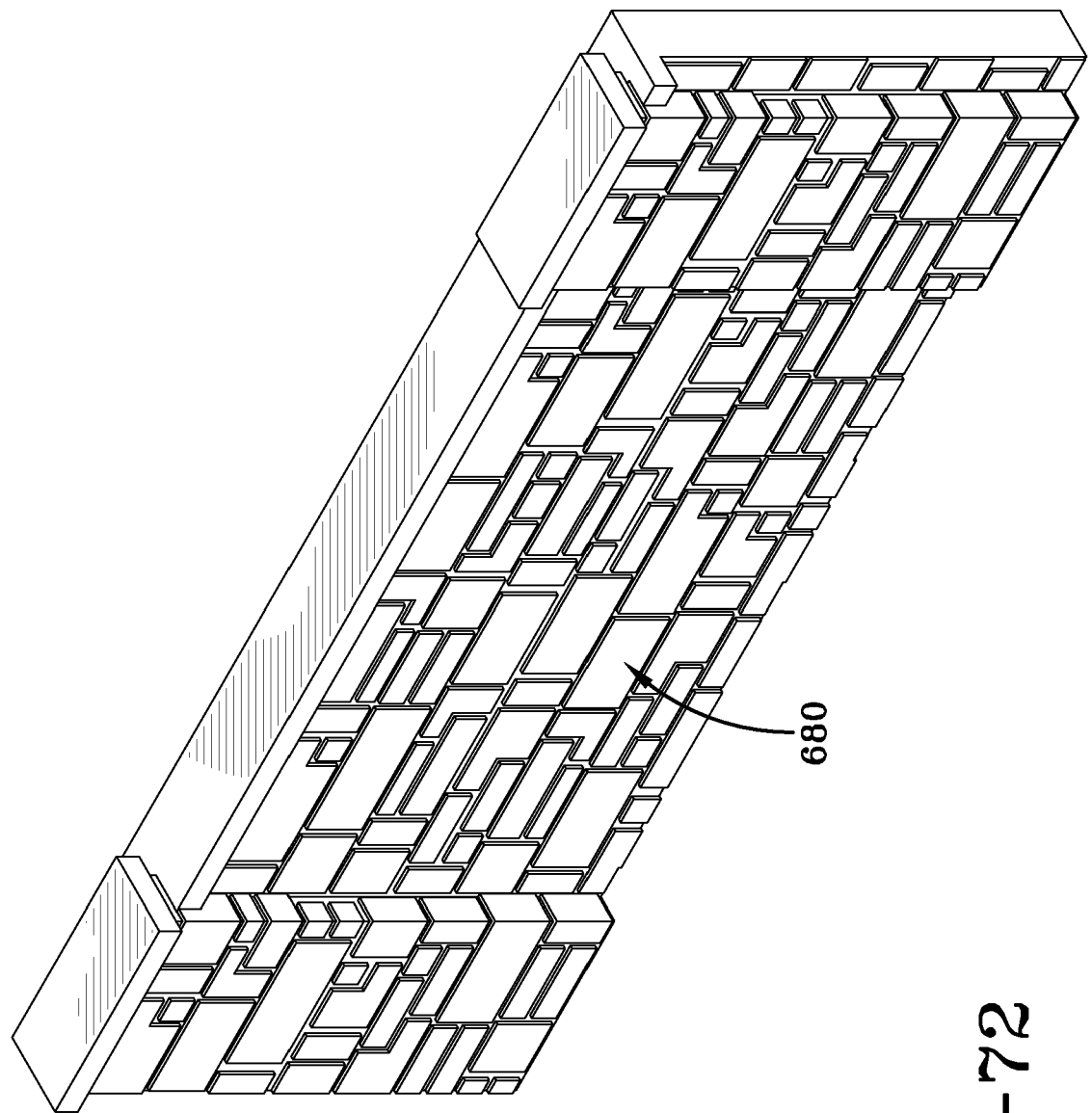
FIG. 72 is a perspective view of an exemplary embodiment of a sound barrier comprising the simulated stone material of the present invention.

FIG. 72 is an exemplary embodiment of a sound barrier 680 comprising the simulated stone material of the present invention. The sound barrier 680 may used near highways, railroads, or other areas having high noise pollution.

Figure 73:
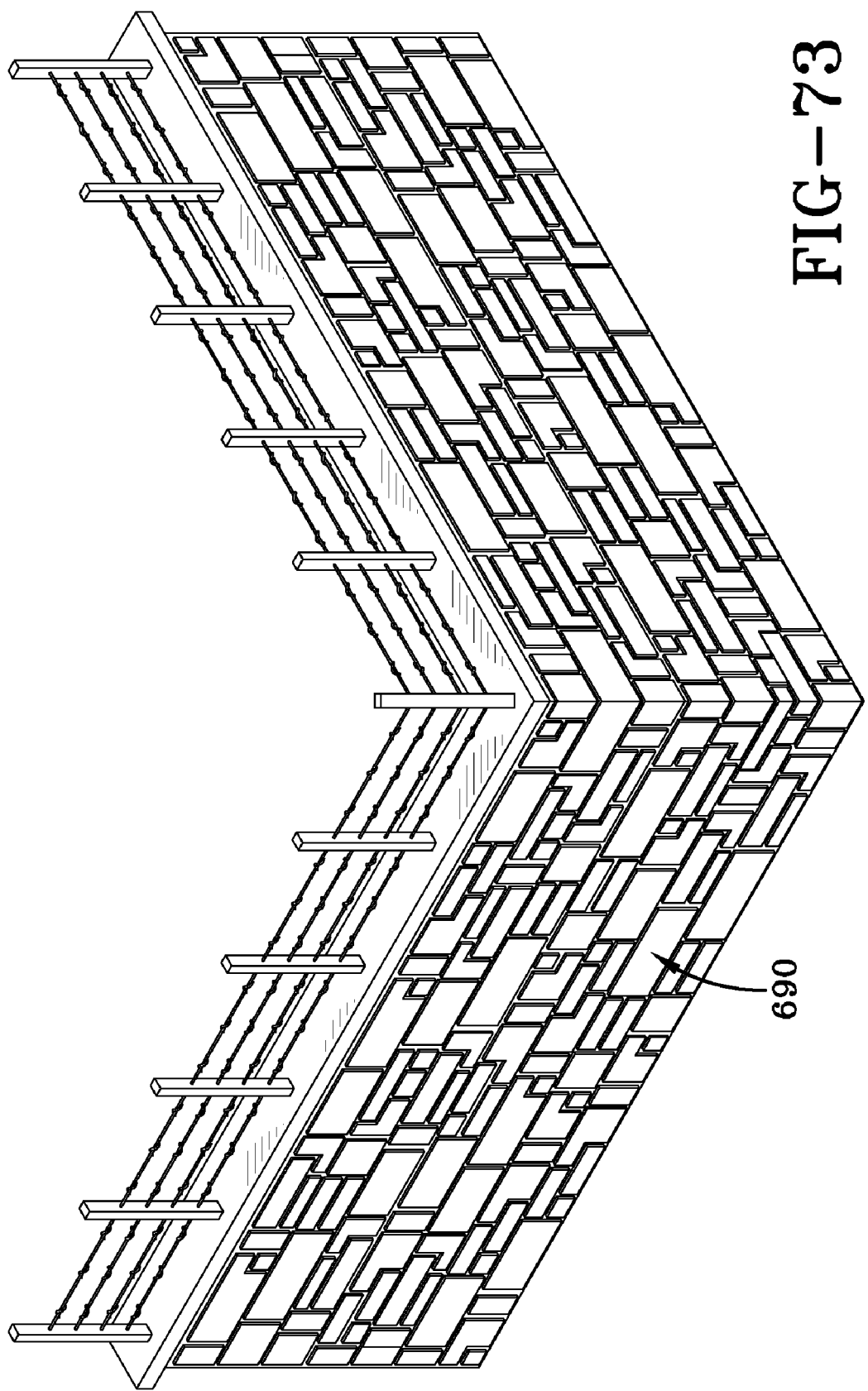
FIG. 73 is a perspective view of an exemplary embodiment of a security wall comprising the simulated stone material of the present invention.

FIG. 73 is an exemplary of a security wall 690 comprising the simulated stone material of the present invention. The strength and durability of the simulated stone material allow high walls such as security walls 690 to be constructed.

Figure 74:
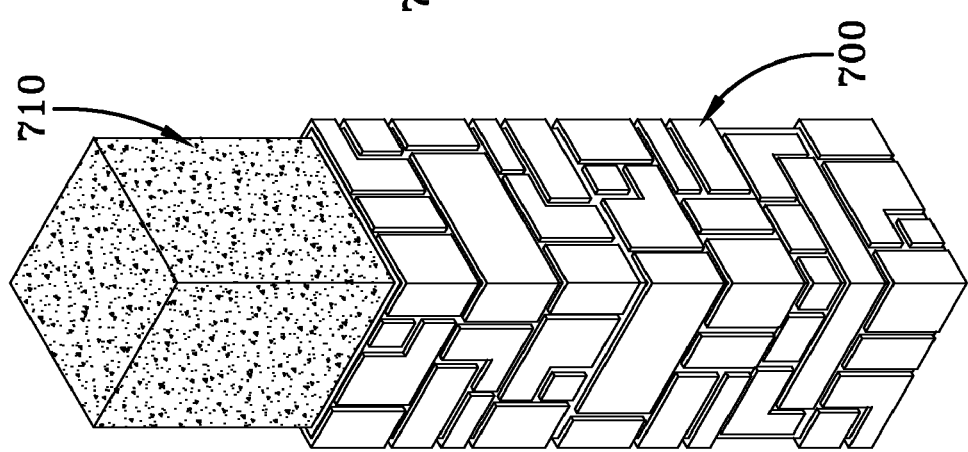
FIG. 74 is a perspective view of an exemplary embodiment of a concrete form comprising the simulated stone material of the present invention.

FIG. 74 is an exemplary embodiment of a concrete form 700 comprising the simulated stone material of the present invention. In one exemplary embodiment the concrete forms 700 may be linked to allow construction of a concrete post 710.

Figure 75:
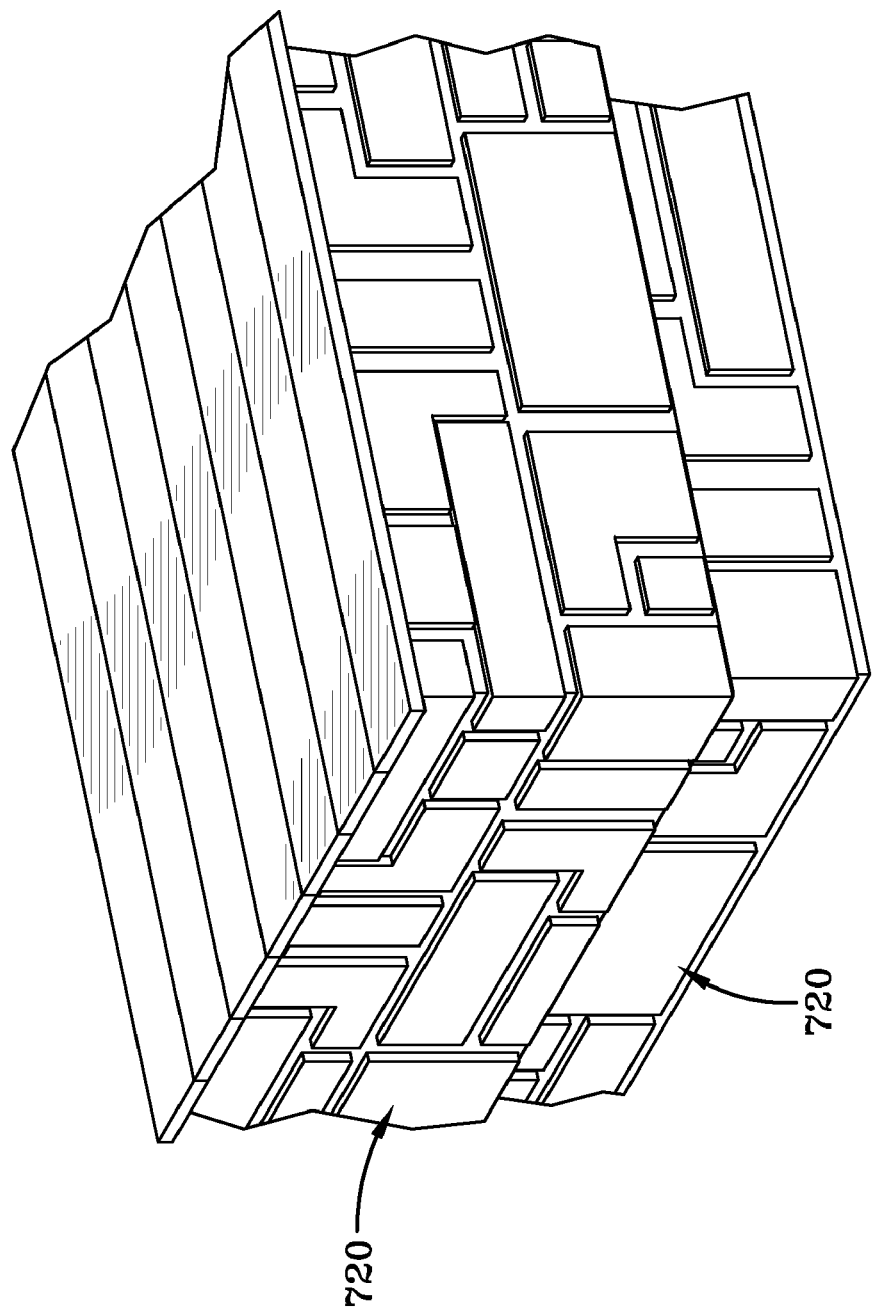
FIG. 75 is a perspective view of an exemplary embodiment of fascia comprising the simulated stone material of the present invention.

FIG. 75 is an exemplary embodiment of fascia 720 comprising the simulated stone material of the present invention. The fascia 720 may be applied to most surfaces to provide an aesthetically pleasing, durable protective covering.

Figure 76:
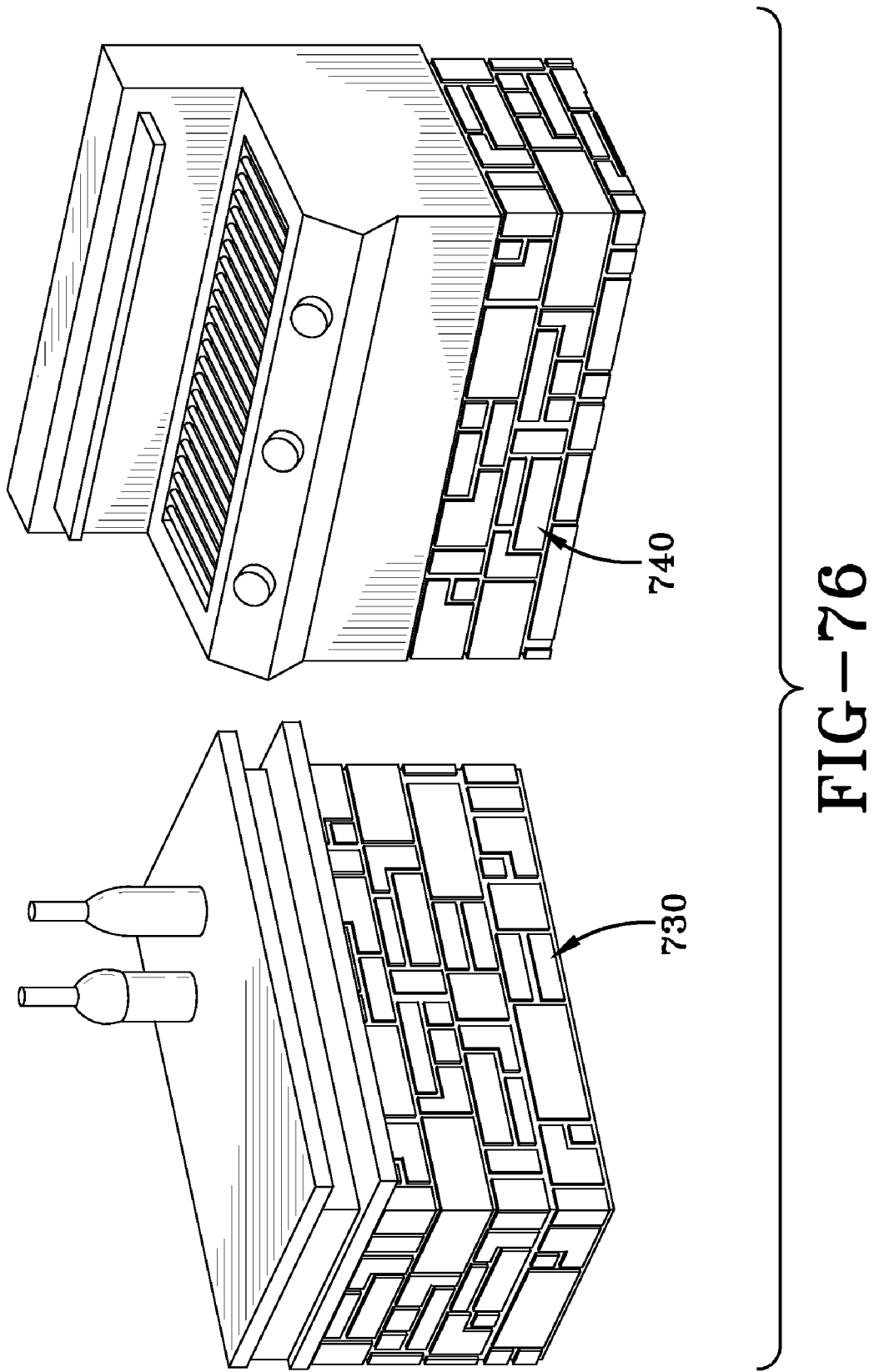
FIG. 76 is a perspective view of an exemplary embodiment of an outdoor bar and kitchen base comprising the simulated stone material of the present invention.

FIG. 76 is an exemplary embodiment of an outdoor bar 730 and kitchen 740 base comprising the simulated stone material of the present invention. Both the bar 730 and kitchen 740 base may include doors and cabinet space.

Figure 77:
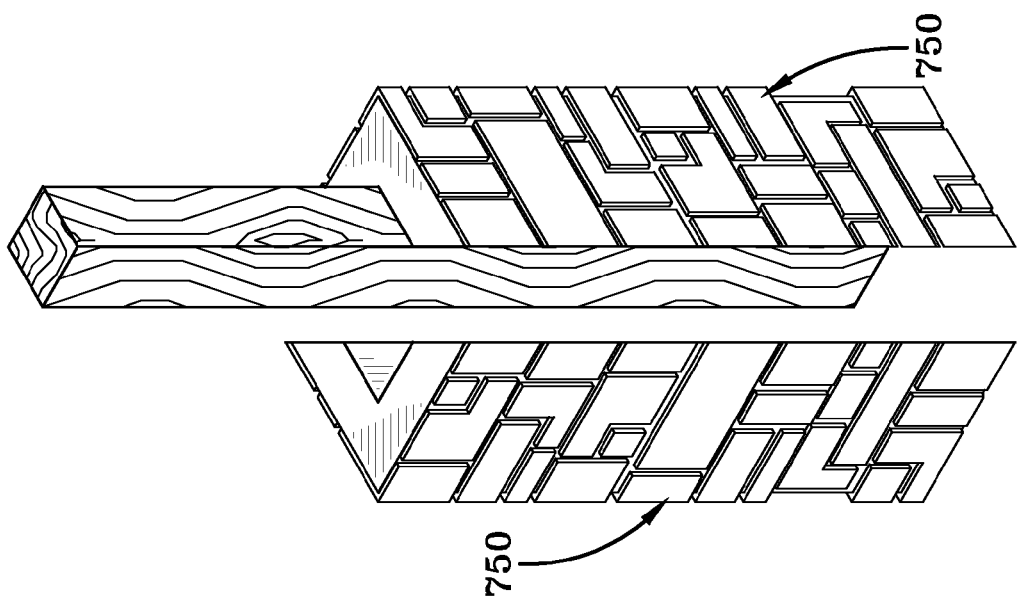
FIG. 77 is a perspective view of an exemplary embodiment of a two piece post wrap comprising the simulated stone material of the present invention.

FIG. 77 is an exemplary embodiment of a two piece post wrap 750 comprising the simulated stone material of the present invention. The two piece post wrap 750 is joined together around an existing post to provide a stone look and provide protection from the elements.

Figure 78:
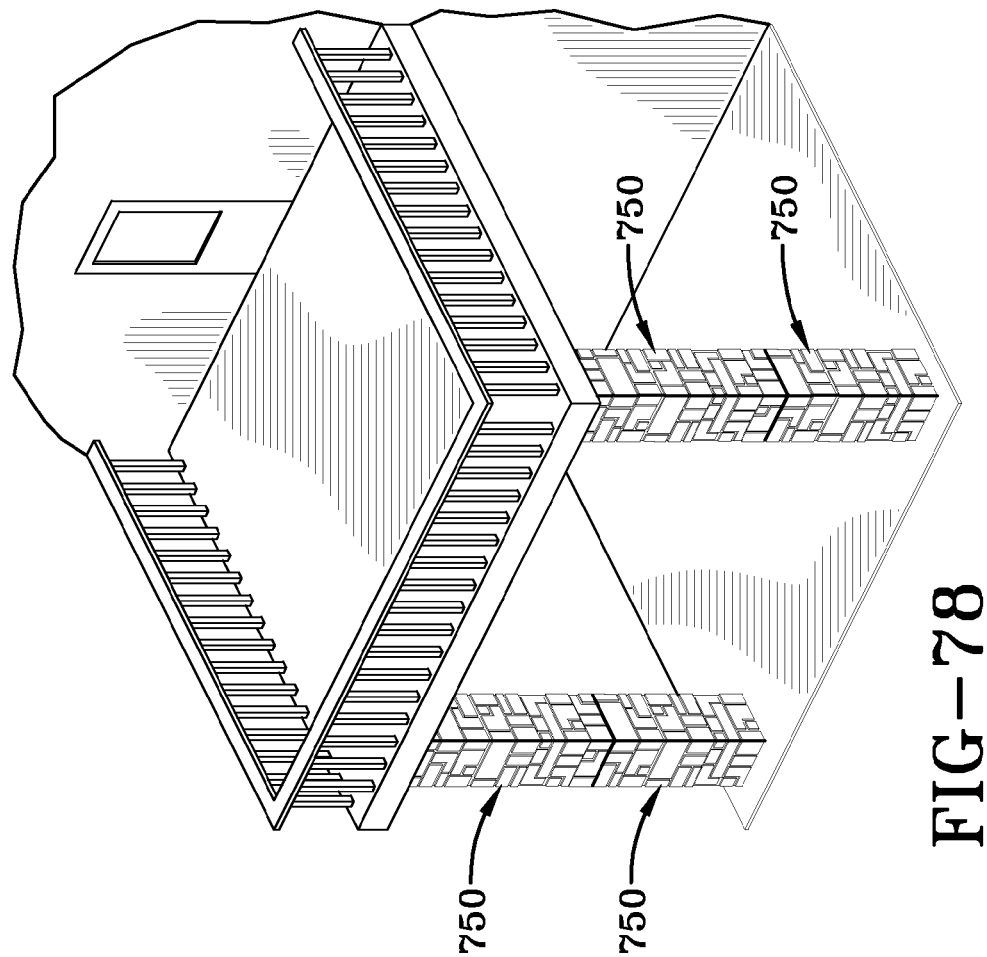
FIG. 78 is a perspective view of an exemplary embodiment of a two piece post wrap comprising the simulated stone material of the present invention.

FIG. 78 is illustration of an exemplary embodiment of the two piece post wrap 750 being used to cover deck support posts. The two piece post 750 wraps may be stacked to achieve a greater height.

FIG. 79 is an exemplary embodiment of a four piece post wrap 760. The four pieces of the post wrap 760 join together and define an opening 770. The opening 770 is large enough so that the post wrap 760 may be placed around an existing post or a new installation post may be passed through the opening 770.

FIG. 80 is an exemplary embodiment of an individual unit of the four piece post wrap 760. The post wrap 760 may have an irregular shape that may be in complimentary communication with adjacent post wrap 760 pieces to provide strength. The post wrap 760 pieces may then be fixed to one another by any suitable means.

FIG. 81 is an illustration of an exemplary embodiment of the four piece post wrap 760 being used to cover deck support columns. The four piece post wraps 760 may be stacked to achieve greater heights.

Figure 82:
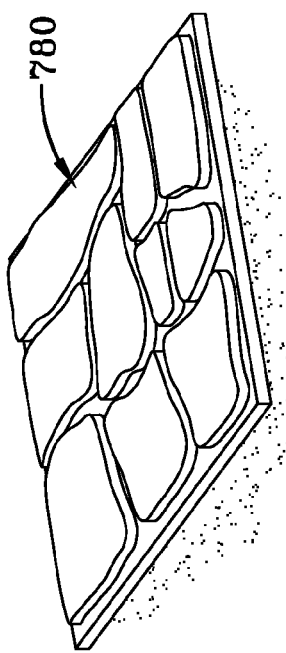
FIG. 82 is a perspective view of an exemplary embodiment of a stone walkway panel comprising the simulated stone material of the present invention.

FIG. 82 is an illustration of an exemplary embodiment of a stone walkway panel 780 comprising the simulated stone material of the present invention. The stone walkway panel 780 may be designed to lie on the ground or supported by framing.

Figure 83:
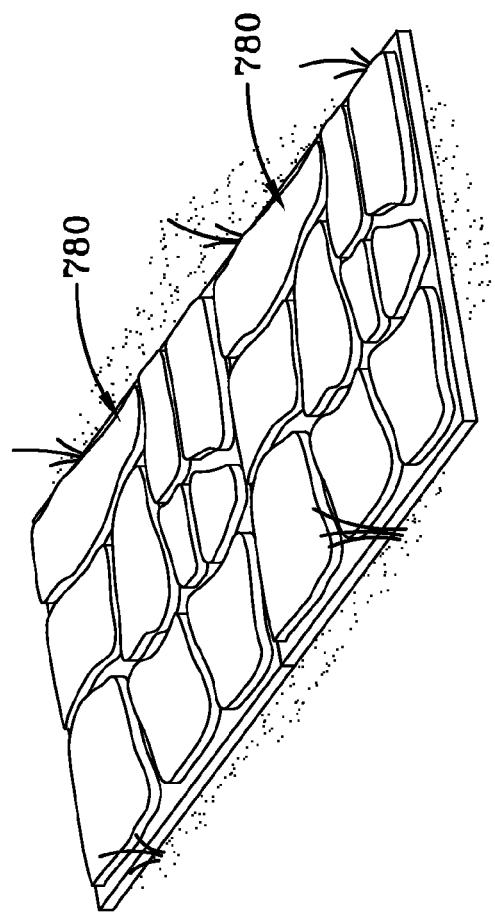
FIG. 83 is a perspective view of an exemplary embodiment of a panelized stone walkway comprising the simulated stone material of the present invention.

FIG. 83 is an illustration of an exemplary embodiment of stone walkway panels 780 linked together to form a walkway directly on the ground.

Figure 84:
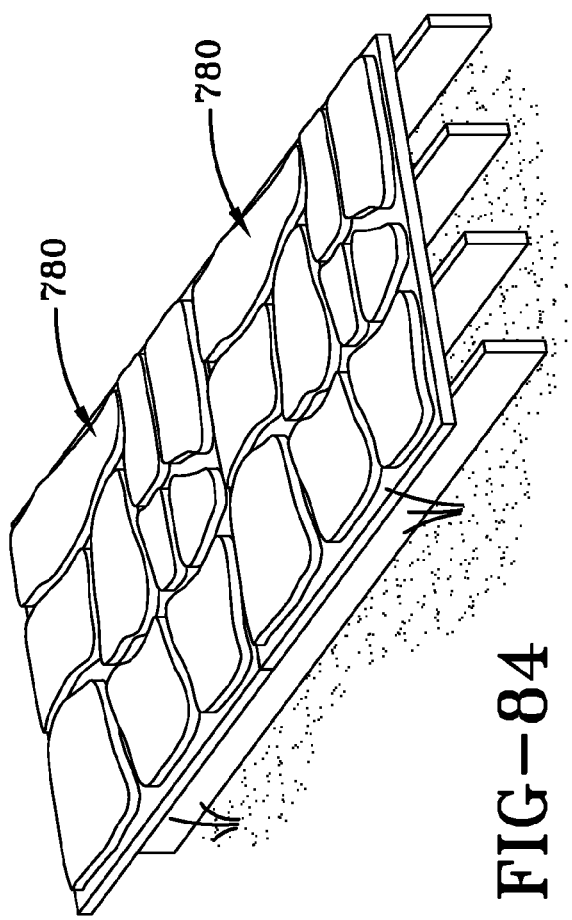
FIG. 84 is a perspective view of an exemplary embodiment of a panelized stone walkway comprising the simulated stone material of the present invention.

FIG. 84 is an illustration of an exemplary embodiment of stone walkway panels 780 linked together to form a walkway supported by framing.

Figure 85:
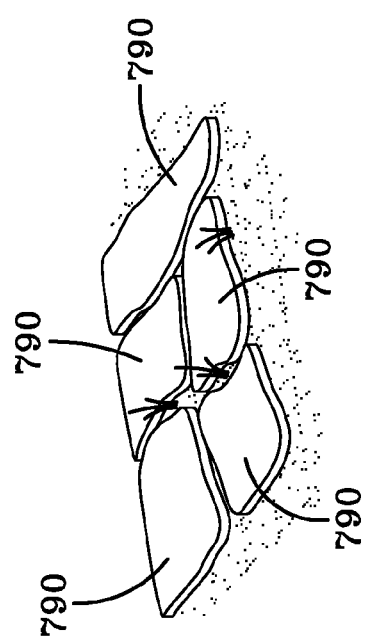
FIG. 85 is a perspective view of exemplary embodiment of an individual stone walkway comprising the simulated stone material of the present invention.

FIG. 85 is an illustration of an exemplary embodiment of an individual walkway stones 790 linked to form a walkway. The individual walkway stones 790 may be arranged so that plant life may grow between the individual walkway stones 790. The individual walkway stones 790 may also be linked so that no space remains between the individual walkway stones 790.

Figure 86:
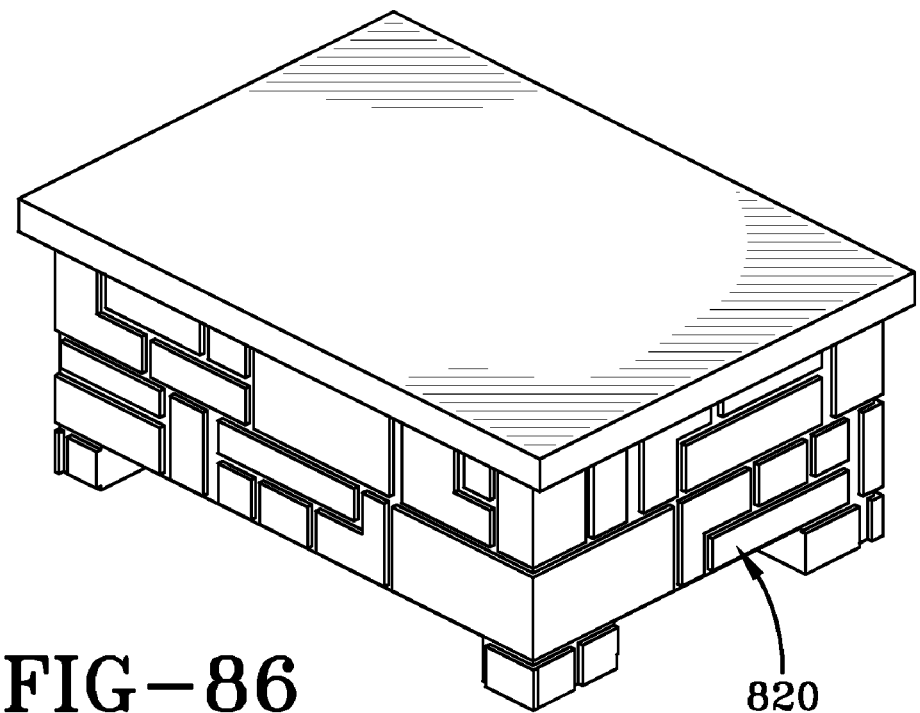
FIG. 86 is a perspective view of an exemplary embodiment of a bench comprising the simulated stone material of the present invention.
Figure 87:
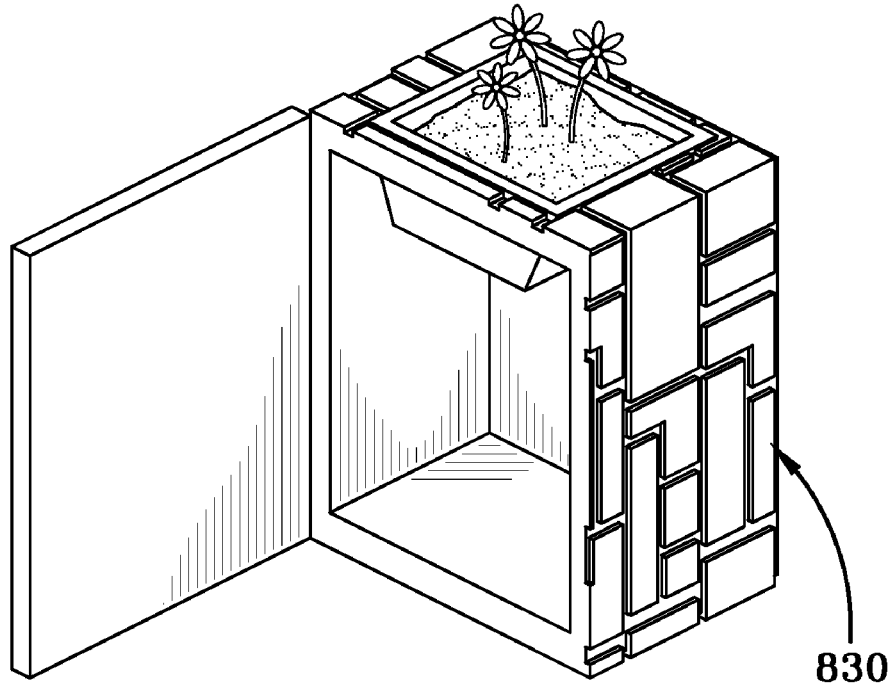
FIG. 87 is a perspective view of an exemplary embodiment of a planter storage unit comprising the simulated stone material of the present invention.

FIGS. 86 and 87 are illustrations of exemplary embodiments of a bench 820 and a planter storage unit 830 respectively.

Figure 88:
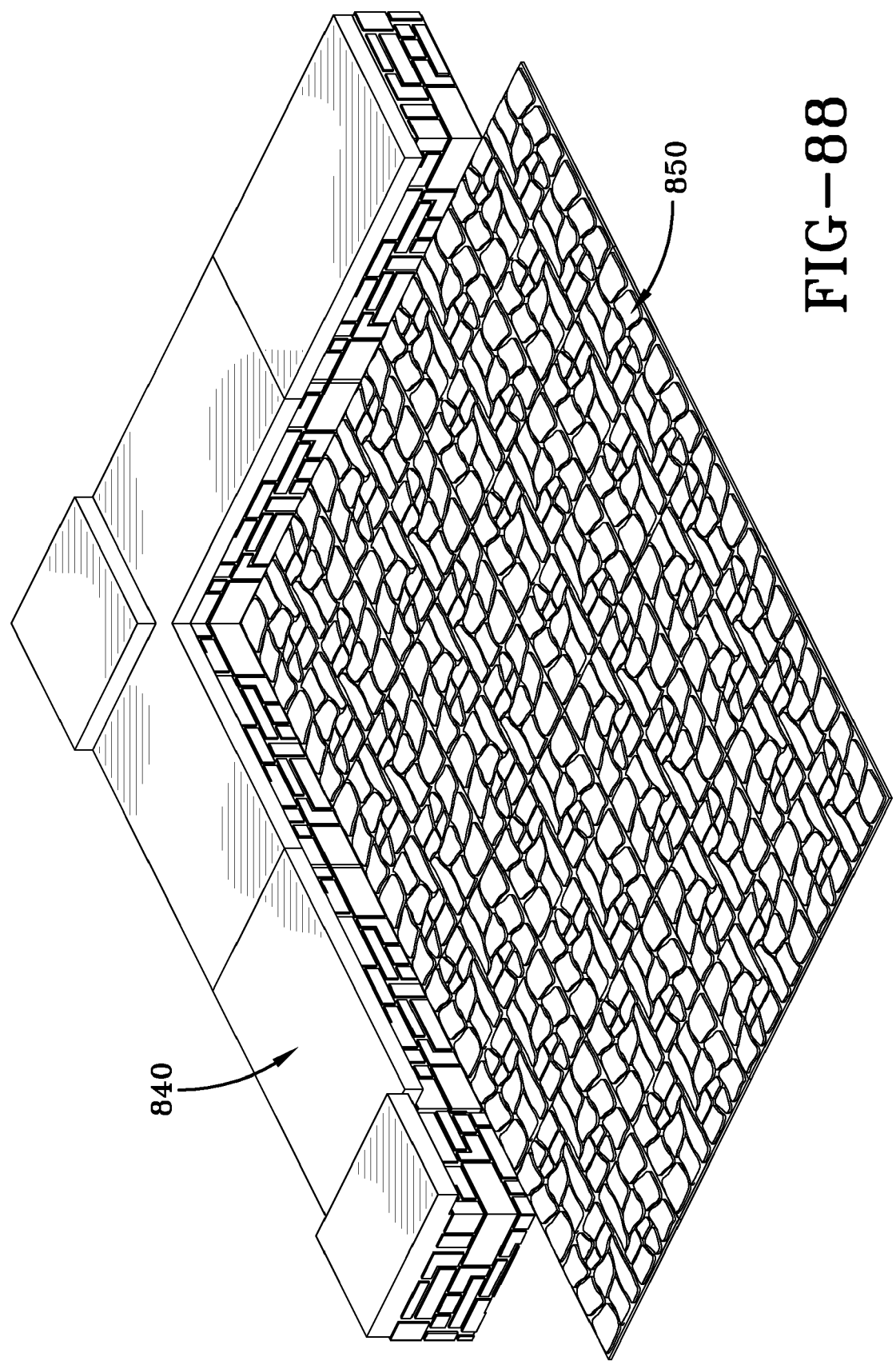
FIG. 88 is a perspective view of an exemplary embodiment of a knee wall and patio stones comprising the simulated stone material of the present invention.

FIG. 88 is an illustration of exemplary embodiments of a knee wall 840 and patio stones 850 comprising the simulated stone material of the present invention. The patio stones 850 may be joined together to form a patio surface. The patio stones 850 may be manufactured as panels.

Figure 89:
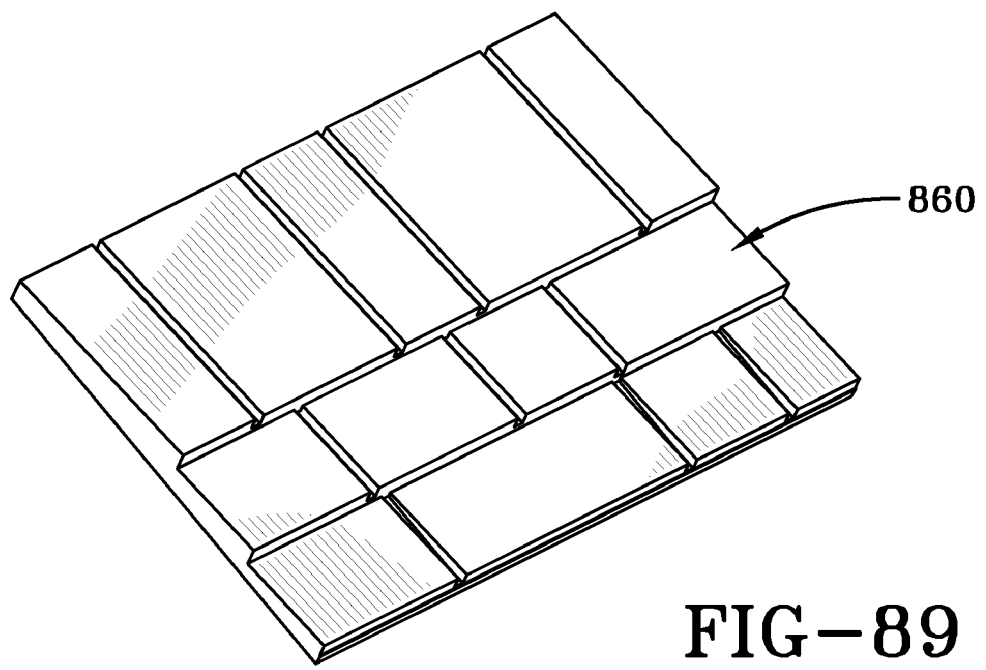
FIG. 89 is a perspective view of an exemplary embodiment of a roofing panel comprising the simulated stone material of the present invention.
Figure 90:
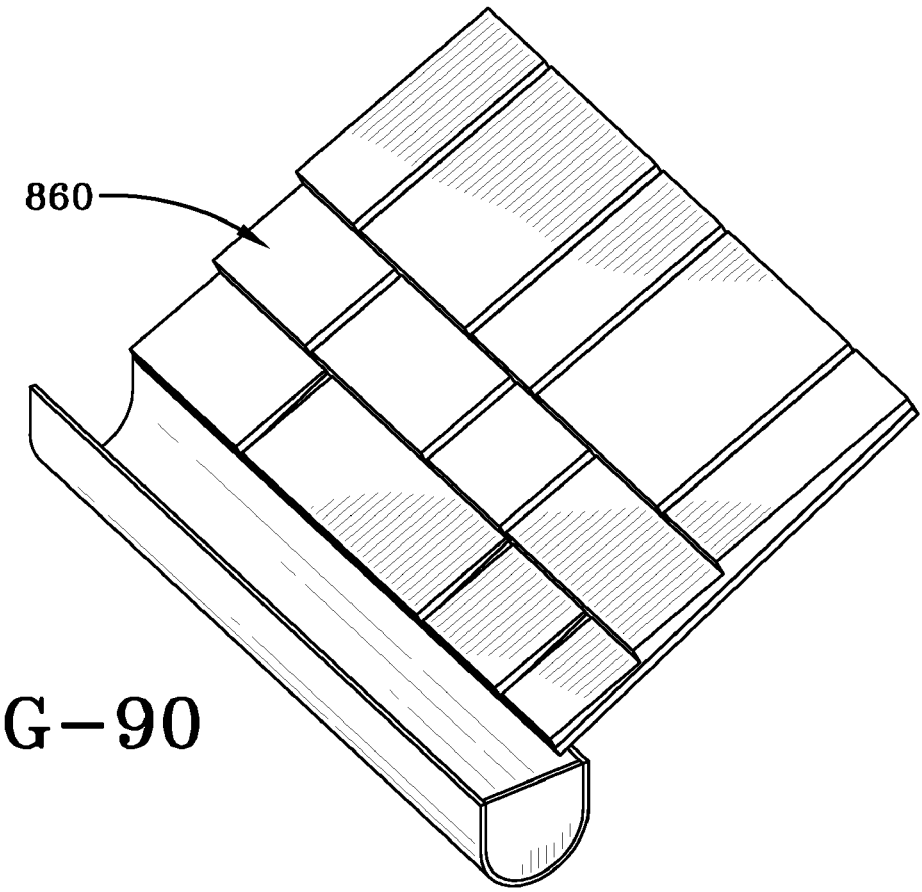
FIG. 90 is an enlarged perspective view of an exemplary embodiment of a roofing panel comprising the simulated stone material of the present invention.

FIG. 89 is an illustration of an exemplary embodiment of a roofing panel 860. FIG. 90 is a close up view of the roofing panel 860. The roofing panel is designed to have an overlapped appearance; however, other designs may be used. The roofing panel 860 is fixed to the roof by a fastener, adhesive, or any other suitable means.

It is to be understood that the above applications are by way of example. One skilled in the art would recognize the ability to interchange the modular core components 500, 520, 540, 560, and 580 to construct various devices. The modular core components may have various sizes depending on the desired application. The modular core components and simulated stone material may also be used in the following applications: water front and inland retaining wall fascia; highway and railroad sound barrier facades; industrial and power station security walls; concrete pouring/finishing systems; concrete forms; outdoor kitchen, bar counter base, and cabinet decorative facing; post covers for railing, porch, under deck, fencing, pagoda/pergola either one piece or piece wraps; fence walls; privacy fence; split/ranch fencing; walkways; stepping stones; pavers; residential and commercial wall cladding, foundation covers, deck skirting, and chimney covers; mailbox, outdoor benches, tables, bars, coolers, storage benches, sheds, garden tools seating accessories, recycling containers, water collection, hose container, trash container, and firewood box; hot tub; pool and spa surroundings; kneel wall or seating; tree base wrap; modular stacking/interlocking component units; roofing panels; landscape edging; portable heater; concealment of propane tanks, well pumps, satellite dish, and air-conditioning units; address plates; business facility name; signage; corral; interior wall covering; basement finishing; interior wet walls; interior agricultural applications such as stables or wineries; indoor bar top and front cladding; interior acoustic walls.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A simulated stone material composite comprising:
   a polymer selected from a group consisting of:
      very low density polyethylene, low density polyethylene, medium density polyethylene, high density polyethylene, polypropylene, nylon, polyvinyl chloride powder, polyvinyl chloride plastisol, acrylic, acrylonitrile butadiene styrene, acrylonitrile styrene acrylate, polycarbonate, polystyrene, high impact polystyrene, sheet molding compound, bulk molding compound, polyurethane foam, polyurethane solid, polyester, ethylene homopolymers, ethylene copolymers, propylene homopolymers, propylene copolymers, vinyl chloride polymers, polyamide, polyalkenes, and ethylene-ester copolymers, urea-formaldehyde, unsaturated polyester, melamine-formaldehyde, polyurethane, unsaturated polyamide, cross-linked thermoplastics, cross-linked elastomers and rubbers, in about 10-95 parts by weight;
   at least one mineral aggregate, in about 1-50 parts by weight;
   an adhesive, in about 0.01-10 parts by weight; and
   at least one colorant, in about 0.01-10 parts by weight;
   wherein the composite is adapted to be used to produce building or construction components including panels, cladding, siding, columns, mailboxes, and other similar components.

2. The simulated stone material of claim 1 wherein the polymer is selected from a group consisting of:
   high density polyethylene and polypropylene.

3. The simulated stone material of claim 2 wherein the polymer is high density polyethylene.

4. The simulated stone material of claim 2 wherein the polymer is polypropylene.

5. The simulated stone material of claim 2 wherein the at least one mineral aggregate is selected from a group consisting of:
   sand, limestone, cement, iron ore, dirt, and stone particles.

6. The simulated stone material of claim 2 wherein the adhesive is selected from a group consisting of:
   natural rubber, styrene-butadiene rubber, cellulose-based glues, acrylic-based glues, polyolefin emulsions and suspensions, and polyurethane adhesives.

7. The simulated stone material of claim 2 wherein the at least one colorant is selected from a group consisting of:
   mineral oxides and synthetic colors.

8. The simulated stone material of claim 2 further comprising at least one additive, in about 0.01-10 parts by weight.

9. The simulated stone material of claim 8 wherein the at least one additive is selected from a group consisting of:
antioxidants, ultraviolet absorbers and stabilizers, nucleating agents, cross-linking agents, coupling agents, compatibilizers, flow aids, process aids, surface modifying additives, and additives to improve scratch resistance.

10. The simulated stone material of claim 1 prepared by the process of:
providing a mold configured to form a panel that is adapted to simulate the appearance of stones;
selecting materials adapted to simulate stone colors and textures;
providing an adhesive, the coloring and texturing materials, and the polymer charge in said mold such that said adhesive retains said coloring and texturing materials; and
molding at a temperature sufficient to accomplish melting fusion and form the simulated stone panel.

11. The simulated stone material of claim 1, wherein a panel is made by a process selected from a group consisting of:
rotational molding, compression molding, vacuum molding, compression casting, injection molding, extrusion blown molding, vacuum thermoforming, pressure thermoforming, casting, spray-up techniques and other suitable molding techniques.

12. The simulated stone material of claim 11, wherein the panel is a component selected from a group consisting of:
posts, columns, half columns, rectangular bases, half round columns, bird fixtures, stands, arbors, pergolas, outdoor sectionals, garbage concealment units, deck posts, integrated deck posts, signage, corrals, bicycle racks, golf course features, outdoor plumbing, barricades, retaining wall fascia, sound barrier facades, security walls, concrete forms, concrete finishing systems, decorative facing, post covers, fencing, walkways, stepping stones, pavers, cladding, mailboxes, benches, tables, bars, coolers, storage bench, sheds, garden tools, seating accessories, recycling containers, water collection, hose containers, trash containers, firewood box, hot tub, pool surrounding, spa surround, knee wall, tree base wrap bench, roofing panels, stackable modular units, landscape edging, portable heater, propane tank concealment, well pump cover concealment, satellite dish concealment, air-conditioning unit concealment, address plates, interior wall covering, basement finishing, wet walls, stables, winery, and acoustic walls.

13. A simulated stone material composite comprising:
a polymer, wherein the polymer is high density polyethylene;
at least one mineral aggregate, in about 1-50 parts by weight;
an adhesive, in about 0.01-10 parts by weight; and
at least one colorant, in about 0.01-10 parts by weight;
wherein the composite is adapted to be used to produce building or construction materials selected from a group comprising panels, cladding, siding, mailboxes and other similar parts.

14. The simulated stone material of claim 11 wherein the at least one mineral aggregate is selected from a group consisting of:
sand, limestone, cement, iron ore, dirt, and stone particles.

15. The simulated stone material of claim 11 wherein the adhesive is selected from a group consisting of:
natural rubber, styrene-butadiene rubber, cellulose-based glues, acrylic-based glues, polyolefin emulsions and suspensions, and polyurethane adhesives.

16. The simulated stone material of claim 11 wherein the at least one colorant is selected from a group consisting of:
mineral oxides and synthetic colors.

17. The simulated stone material of claim 11 further comprising at least one additive, in about 0.01-10 parts by weight.

18. The simulated stone material of claim 15 wherein the at least one additive is selected from a group consisting of:
antioxidants, ultraviolet absorbers and stabilizers, nucleating agents, cross-linking agents, coupling agents, compatibilizers, flow aids, process aids, surface modifying additives, and additives to improve scratch resistance.

19. The simulated stone material of claim 11 prepared by the process of:
providing a mold configured to form a panel that is adapted to simulate the appearance of stones;
selecting materials adapted to simulate stone colors and textures;
providing an adhesive, the coloring and texturing materials, and the polymer charge in said mold such that said adhesive retains said coloring and texturing materials; and
molding at a temperature sufficient to accomplish melting fusion and form the simulated stone panel.

20. A simulated stone material composite comprising:
a polymer, wherein the polymer is polypropylene;
at least one mineral aggregate, in about 1-50 parts by weight;
an adhesive, in about 0.01-10 parts by weight; and
at least one colorant, in about 0.01-10 parts by weight;
wherein the composite is adapted to be used to produce building or construction materials selected from a group comprising panels, cladding, siding, mailboxes and other similar parts.

21. The simulated stone material of claim 19 wherein the at least one mineral aggregate is selected from a group consisting of:
sand, limestone, cement, iron ore, dirt, and stone particles.

22. The simulated stone material of claim 19 wherein the adhesive is selected from a group consisting of:
natural rubber, styrene-butadiene rubber, cellulose-based glues, acrylic-based glues, polyolefin emulsions and suspensions, and polyurethane adhesives.

23. The simulated stone material of claim 19 wherein the at least one colorant is selected from a group consisting of:
mineral oxides and synthetic colors.

24. The simulated stone material of claim 19 further comprising at least one additive, in about 0.01-10 parts by weight.

25. The simulated stone material of claim 22 wherein the at least one additive is selected from a group consisting of:
antioxidants, ultraviolet absorbers and stabilizers, nucleating agents, cross-linking agents, coupling agents, compatibilizers, flow aids, process aids, surface modifying additives, and additives to improve scratch resistance.

26. The simulated stone material of claim 19 prepared by the process of:
providing a mold configured to form a panel that is adapted to simulate the appearance of stones;
selecting materials adapted to simulate stone colors and textures;
providing an adhesive, the coloring and texturing materials, and the polymer charge in said mold such that said adhesive retains said coloring and texturing materials; and
molding at a temperature sufficient to accomplish melting fusion and form the simulated stone panel.

* * * * *

UNITED STATES PATENT AND TRADEMARK OFFICE
CERTIFICATE OF CORRECTION

PATENT NO. : 7,790,784 B2
APPLICATION NO. : 12/057173
DATED : September 7, 2010
INVENTOR(S) : Nasr et al.

It is certified that error appears in the above-identified patent and that said Letters Patent is hereby corrected as shown below:

In The Specifications:
In column 21, line 35, please delete "two columns 560." and insert -- two columns 540. --.

Signed and Sealed this

Fourteenth Day of December, 2010

David J. Kappos
*Director of the United States Patent and Trademark Office*